(12) United States Patent
Bhatt et al.

(10) Patent No.: US 8,285,593 B2
(45) Date of Patent: Oct. 9, 2012

(54) IDENTIFYING SOURCE MATERIAL ASSOCIATED WITH FOOD PRODUCTS USING BILL OF MATERIAL

(75) Inventors: Himanshu V. Bhatt, Plano, TX (US); Rong Zeng Cao, Beijing (CN); Wei Ding, Beijing (CN); Xiang Yang He, Beijing (CN); Shun Jiang, Beijing (CN); Juhnyoung Lee, Yorktown Heights, NY (US); Feng Li, Beijing (CN); Shih-Gong Li, Beijing (CN); Tie Liu, Beijing (CN); Feng Chun Wang, Beijing (CN); Hao Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 12/916,103

(22) Filed: Oct. 29, 2010

(65) Prior Publication Data
US 2012/0109789 A1    May 3, 2012

(51) Int. Cl.
G06G 1/14 (2006.01)
G06F 17/50 (2006.01)
(52) U.S. Cl. .......................................... 705/22; 705/29
(58) Field of Classification Search .................. 705/22, 705/29
See application file for complete search history.

(56) References Cited

U.S. PATENT DOCUMENTS

| 5,478,990 | A  | * | 12/1995 | Montanari et al. ............. 235/375 |
|---|---|---|---|---|
| 6,671,698 | B2 | * | 12/2003 | Pickett et al. ........................ 1/1 |
| 6,691,135 | B2 | * | 2/2004 | Pickett et al. ........................ 1/1 |
| 6,778,872 | B2 | * | 8/2004 | Jorgenson et al. ............. 700/106 |
| 6,817,757 | B1 | * | 11/2004 | Wallace ........................ 374/120 |
| 6,859,672 | B2 | * | 2/2005 | Roberts et al. ................... 700/89 |
| 6,874,000 | B2 | * | 3/2005 | Sholl et al. ............................. 1/1 |
| 6,982,640 | B2 |   | 1/2006 | Lindsay et al. |
| 7,229,764 | B2 |   | 6/2007 | Plastow et al. |
| 7,260,509 | B1 | * | 8/2007 | Brand et al. ...................... 703/2 |
| 7,372,003 | B2 |   | 5/2008 | Kates |
| 7,383,201 | B2 | * | 6/2008 | Matsuzaki et al. ............ 705/7.25 |
| 7,440,811 | B2 | * | 10/2008 | Giebels et al. ................. 700/100 |
| 7,496,530 | B2 | * | 2/2009 | Cheng et al. ..................... 705/28 |

(Continued)

OTHER PUBLICATIONS

Linus Opera (2002). Traceability in agriculture and food supply chain: a review of basic concepts, technological implications, and future prospects. Food, Agriculture & Env. 1(1).*

(Continued)

*Primary Examiner* — Elaine Gort
*Assistant Examiner* — Peter L Ludwig
(74) *Attorney, Agent, or Firm* — Scully, Scott, Murphy & Presser, P.C.; William Stock, Esq.

(57) ABSTRACT

Identifying one or more source units for one or more food items may include assigning a sequence of numbers to a plurality of source units received at a processing entity and assigning a sequence of numbers to a plurality of end product units processed from the plurality of source units at the processing entity. A production rate associated with the end product units may be determined from a bill of materials associated with the end product units. A probability distribution function may be generated using at least the production rate. The probability distribution function maps a range of the sequence numbers associated with the plurality of source units to a range of sequence numbers associated with the end product units. A conversion algorithm may be generated that uses the probability distribution function to determine a source unit associated with a selected end product unit.

16 Claims, 18 Drawing Sheets

U.S. PATENT DOCUMENTS

| | | | |
|---|---|---|---|
| 7,788,203 B2* | 8/2010 | Friedlander et al. | 706/47 |
| 7,909,239 B2* | 3/2011 | Grant et al. | 235/375 |
| 7,949,154 B2* | 5/2011 | DeLuca | 382/110 |
| 2001/0056359 A1* | 12/2001 | Abreu | 705/3 |
| 2003/0069772 A1* | 4/2003 | Roberts et al. | 705/7 |
| 2003/0083947 A1* | 5/2003 | Hoffman et al. | 705/22 |
| 2003/0150909 A1* | 8/2003 | Markham et al. | 235/376 |
| 2003/0236768 A1* | 12/2003 | Sribhibhadh et al. | 707/1 |
| 2004/0103043 A1 | 5/2004 | Reade et al. | |
| 2004/0177011 A1* | 9/2004 | Ramsay et al. | 705/28 |
| 2005/0278296 A1* | 12/2005 | Bostwick | 707/1 |
| 2006/0079979 A1* | 4/2006 | Giebels et al. | 700/96 |
| 2007/0142953 A1* | 6/2007 | McCarthy | 700/115 |
| 2007/0251197 A1 | 11/2007 | Roberts et al. | |
| 2007/0288306 A1* | 12/2007 | Ohishi et al. | 705/11 |
| 2008/0015721 A1* | 1/2008 | Spearman | 700/99 |
| 2008/0144880 A1* | 6/2008 | DeLuca | 382/100 |
| 2008/0148365 A1* | 6/2008 | Yoshida et al. | 726/4 |
| 2008/0208814 A1* | 8/2008 | Friedlander et al. | 707/3 |
| 2008/0215410 A1* | 9/2008 | Cheng et al. | 705/8 |
| 2008/0223929 A1* | 9/2008 | Togashi et al. | 235/385 |
| 2009/0030667 A1* | 1/2009 | Toloo et al. | 703/17 |
| 2010/0205044 A1* | 8/2010 | Scheer | 705/10 |
| 2011/0004485 A1* | 1/2011 | Sholl et al. | 705/1.1 |
| 2011/0202434 A1* | 8/2011 | Dance et al. | 705/28 |
| 2011/0254731 A1* | 10/2011 | Musmeci | 342/357.25 |

OTHER PUBLICATIONS

S. Hsieh & K.C. Tsai (2001). A BOM Oriented Class-based Storage Assginment in an Automated Storage/Retrieval System. Intl J. Adv. Tech. 17.*

EPC Information Services (EPCIS) Version 1.0 Specification. (2007).*

* cited by examiner

IDENTIFYING SOURCE MATERIAL ASSOCIATED WITH FOOD PRODUCTS USING BILL OF MATERIAL

FIELD

The present disclosure relates generally to computer implemented systems and methods for product supply networks, and more particularly to identifying source units of an end product, e.g. food.

BACKGROUND

The food industry network is vast and a large amount of processing goes on in producing food from the raw material to the end product which can be consumed by consumers. Tracking food product to its inception and mid stages may not be an easy task. Missing data and connections in between stages and/or locations of food production can hinder accurate tracking. This all leads to difficulty in identifying actual sources from which contaminated or problematic food came from. Further, traditional strategies for food incidents focus on efficiently responding to the incidents after they occur. To that end, the present disclosure is directed to enabling on-going monitoring of food processing stages and support of proactive actions to prevent food incidents.

BRIEF SUMMARY

A method and system for identifying one or more source units for one or more food product items may be provided. The method, in one aspect, may include assigning a sequence of numbers to a plurality of source units received at a processing entity, and assigning a sequence of numbers to a plurality of end product units processed from the plurality of source units at the processing entity. The method may also include determining a production rate associated with the food product units from a bill of materials associated with the food product units, and generating a probability distribution function by a processor using at least the production rate, the probability distribution function for mapping a range of the sequence numbers associated with the plurality of source units to a range of sequence numbers associated with the food product units. The method may further include identifying a source unit associated with the selected food product by executing a conversion algorithm that uses the probability distribution function to determine source material associated with the selected food product unit.

A system for identifying one or more source units for one or more food product item, in one aspect, may include a sequence of entry module operable to assign a sequence of numbers to a plurality of source units received at a processing entity. A sequence of exit module may be operable to assign a sequence of numbers to a plurality of food product units processed from the plurality of source units at the processing entity. A bill of materials module may be operable to determine a production rate associated the end product units from a bill of materials associated with the end product units. A conversion module may be operable to generate a probability distribution function using at least the production rate. The probability distribution function may be for mapping a range of the sequence numbers associated with the plurality of source units to a range of sequence numbers associated with the end product units. The conversion module may be further operable to generate a conversion algorithm that uses the probability distribution function to determine a source unit associated with a selected end product unit. The conversion module further may be operable to identify the source unit associated with a selected end product unit using the conversion algorithm.

In another embodiment, a system and method of determining aggregate impact of food hazard are provided. The method of determining aggregate impact of food hazard, in one aspect, may include creating a traceability model that includes information associated with a product flow across organization borders. The method also may include creating a daisy chain model, the daisy chain model including information associated with relationships among at least one or more risk factors in the organization and one or more organization's operation processes. The method further may include creating a hazard dynamic model including information associated with dynamics of a single hazard over time and environment. The method also may include determining a plurality of organizations impacted by an external risk event by tracing the product flow of a product associated with the external risk event across organizations border in the traceability model, and identifying one or more organization's operation processes associated with the determined plurality of organizations impacted by an external risk event by tracing the daisy chain model. The method further may include determining one or more risk factors associated with the one or more organization's operation processes using the daisy chain model.

A system for determining aggregate impact of food hazard, in one aspect, may include a traceability model that includes information associated with a product flow across organization borders. A daisy chain model may be associated with an organization, the daisy chain model including information associated with relationships among at least one or more risk factors in the organization and one or more organization's operation processes. A hazard dynamic model may include information associated with dynamics of a single hazard over time and environment. A module may be operable to determine a plurality of organizations impacted by an external risk event by tracing the product flow of a product associated with the external risk event across organizations border in the traceability model. The module may be further operable to identify one or more organization's operation processes associated with the determined plurality of organizations impacted by an external risk event by tracing the daisy chain model, the module further operable to determine one or more risk factors associated with the one or more organization's operation processes using the daisy chain model.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Conversion Traceability for Product Supply Network

Figure 1:
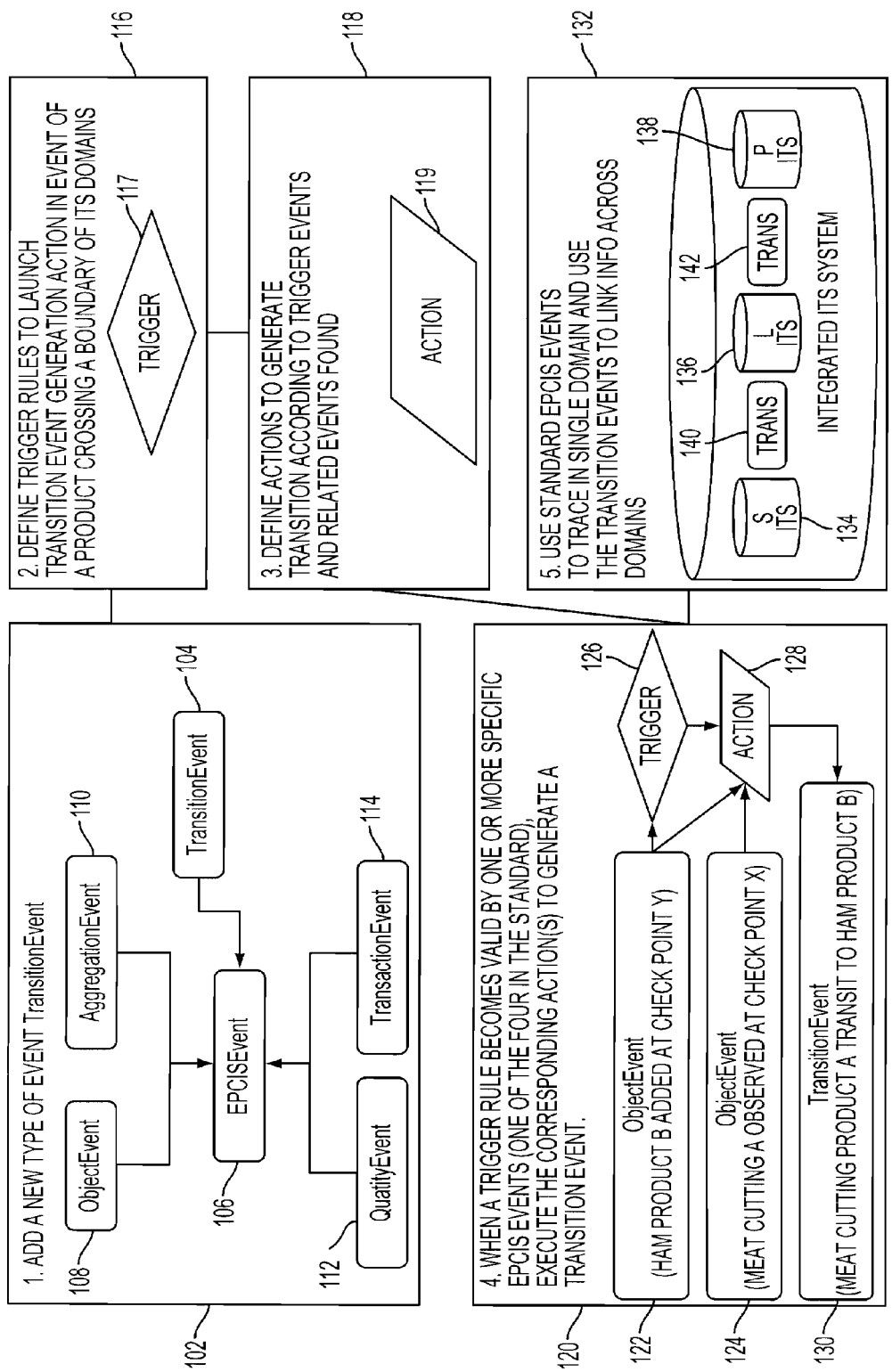
FIG. 1 is a diagram illustrating the transition event type that enables tracing of the products from end-to-end in one embodiment of the present disclosure.

Information Traceability Server (ITS) is computer system software that is used to trace a product via a unique product code in one specific domain. A mechanism is disclosed in the present application that uses the ITS to trace a product from beginning to end of its lifecycle across multiple domains, even when the product acquires a different product code as it enters different domain. The mechanism of the present disclosure thus provides capability for end-to-end traceability of a product. In one aspect, the mechanism employs event-based techniques to enable the end-to-end tracing. In another aspect, using the event-based techniques, components of supply chain (e.g., different domains), for instance, may be linked.

The following description uses food products as examples for describing the tracing of the food products from their inception to consumption by the consumers. However, the mechanism described herein may be utilized for other products as well.

ITS follows a global standard called the Electronic Product Code (EPC) Information Services (EPCIS) specification to implement an information system, for example, dependent of the database system used to store and retrieve data. ITS collects and stores product related trace data on every relevant event as check points. Types of events include an object event, aggregation event, quantity event, transaction event and a transition event. An object event represents an event that happened to one or more entities denoted by EPCs (Electronic Product Code). For example, when a food product is produced and assigned a new product code (e.g., p001), an ObjectEvent.ADD event is generated and stored into information system. A sample event may contain the following fields:

{Name=ObjectEvent; Action=ADD; Time=2009-8-18 11:18; EPCList={p001}; Location=CompanyA.Workplace1; }

An aggregation event represents an event that happened to one or more entities denoted by EPCs that are physically aggregated together, for example, physically constrained to be in the same place at the same time, as when cases are aggregated to a pallet. For instance, when multiple food products with different product codes are packaged into a "container" which has a separated product code, an AggregationEvent.ADD event is generated. A sample event may contain the following fields:

{Name=AggregationEvent; Action=ADD; Time=2009-8-18 11:18; Location=CompnayA.Workplace2; parentID=container1; childEPCs={p001,p002,p003}}

A quantity event represents an event concerned with a specific quantity of entities sharing a common EPC class, but where the individual identities of the entities are not specified. For example, an inventory check can generate an event to report the inventory level of one class of product. A sample event may contain the following fields:

{Name=QuantityEvent; Time=2009-8-18 11:18; epcClass=productClass1;Location=CompanyA.Warehouse1; }

A transaction event represents an event in which one or more entities denoted by EPCs become associated or disassociated with one or more identified business transactions. For example, multiple products with different product codes are associated with a transaction. A sample event may contain the following fields:

{Name=TransactionEvent; Action=ADD; Time=2009-8-18 11:18; bizTransactionList={transaction1}; epcList={p001, p002, p003}

A transition event represents an event in which a product transitions or transforms into another product, or gets transported from one place to another. For example, a livestock transforms into meat, meat transforms into packaged pork, meat transforms into a canned product at a cannery, a canned product gets transported from a cannery to a distribution center and then to a store, etc.

Each product transformation or transportation is involved with two domains, i.e., source and destination (or target) domains. For example, when a canned product is transported from a cannery to a store, the cannery is the source domain and the store is the destination domain. For product traceability, each domain may have an ITS system which collects and records every relevant event in the domain. A transition event of the present disclosure provides mapping between events in the source domain and those in the destination domain, so that product trace information can be stitched (or linked) together across multiple ITS systems deployed among multiple domains where a product goes through its life time.

ITS uses EPC as an index or key to trace the product by searching all the events with the same EPC. The mechanism of the present disclosure allows the tracing even when the EPC changes during the lifecycle of a product, for example, when it transforms from one type to another, for instance, by implementing the transition event.

The transition event allows tracing of the link between EPCs of product and its dependent product. For example, when a farmer raises a livestock with some feed product, a transition event can be used to express this "eat" semantic in EPCIS. Another example is a livestock and the transformed meat product from the livestock that have different EPCs. Using the transition event, the livestock and the meat product may be linked and traced even though they have different EPCs. Thus, the end product that is meat can be tracked to its original livestock and even to the feeds used to raise that the livestock.

FIG. 1 is a diagram illustrating the transition event type that enables tracing of the products from end-to-end. Adding a new type of event which may be referred to as a Transition-Event is shown at 102. A transition event type 104 is implemented that interacts with the EPCIS events 106 such as the object event 108, aggregation event 110, quantity event 112, and transaction event 114.

Defining trigger rules to launch transition event generation action in the event of a product crossing a boundary of ITS domains is shown at 116. Trigger rules 117 are defined to launch transition event generation action in the event of a product crossing a boundary of ITS domains. Domain here refers to a facility where a type of a product is maintained. For example, a farm that raises livestock is an example of a domain. A meat processing facility that processes and maintains the meat product transformed from the livestock is another example of a domain. The trigger rules may be defined by taking the past events as parameters to describe the action to trigger. All the properties defined with an event can be used as a condition in trigger rules. Further, the temporal relationship of events can be used. Since users are allowed to define domain specific event properties according to their working environment, properties such as 'product manufacturing line x' can be defined, and events happening in the property can be specified in the trigger rules. An example trigger event happening in that property may be, 'Product T (e.g., Sausage) produced at product manufacturing line 1 exiting the product manufacturing line x." An example trigger rule associated with that property and event may be, 'When Product T (e.g., Sausage) produced at product manufacturing line 1 exits the line (which means the sausage is produced, packaged at the end of a manufacturing line, and the packaged sausage an identity and ready for quality check and delivery) AND one hour before Product S (one of the source of the T, e.g., packaged meat pieces) is scanned at product manufacturing line 1 entry A, then trigger an action with the two events as input'. A trigger rule defines the trigger condition and the trigger action that is to be performed if the condition is satisfied at runtime. That is, in response to capturing one or more events that satisfy the condition portion of the rule, then the action portion of the rule is executed.

Defining actions to generate transition according to trigger events and related events found is shown at 118. Actions 119 to generate transition according to trigger events and related events found are defined. Actions 119 may be implemented as programming codes, e.g., Java™ codes which has interfaces that could be used to generate new events such as transition events and put those events into the event queue.

Shown at 120, when a trigger rule becomes valid by one or more specific EPCIS events (e.g., object event, aggregation event, quantity event, transaction event), the corresponding one or more actions are executed to generate a transition event. For example, the object events shown at 122 and 124 may fall within one or more of the defined trigger rules 126, which then triggers an action 128 to create a transition event 130. That is, ObjectEvent 122 is used as a rule condition defined in Trigger 126. Once it is triggered, event 122 and 124 (which is a related event defined in Trigger 126) will be taken as input for Action 128 to generate a transition event 130.

Using standard EPCIS events to trace in a single domain and using the transition events to link information across domains are shown at 132. Once the transition events (e.g., 140, 142) are generated, e.g., as in 120, ITS or the like may query the events and trace a product across different domains (e.g., 134, 136, 138). A transition event may include the properties of the source and target of a transition process, with other information such as generation time, location, etc., as properties. The information could be used as query condition. The transition events may be stored in a relational database tables, and the queries can be defined as structured query language (SQL) query.

Figure 2:
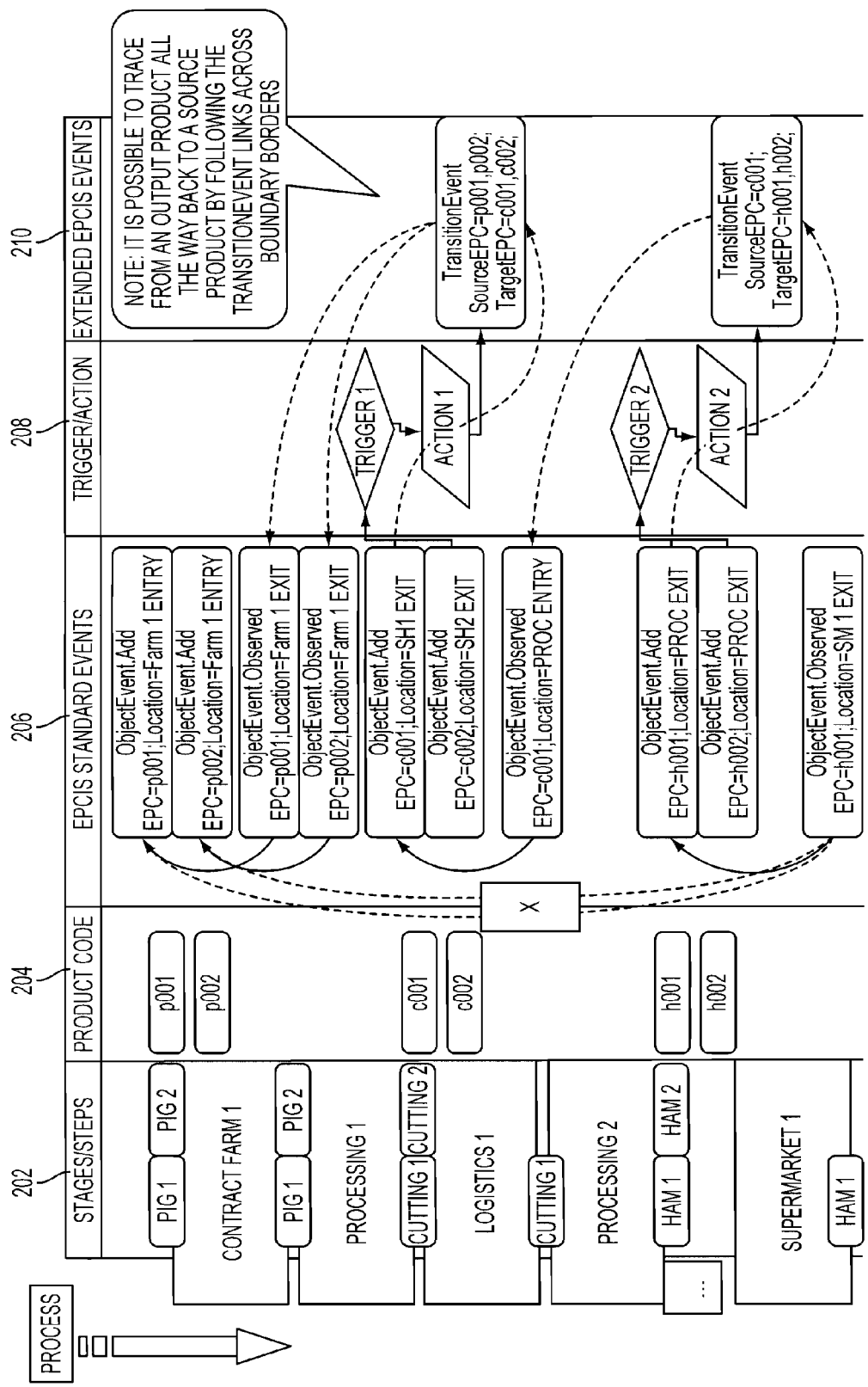
FIG. 2 illustrates a sample scenario that shows the workings of the transition event type of the present disclosure in one embodiment.

FIG. 2 illustrates a sample scenario that shows the workings of the transition event type of the present disclosure in one embodiment. The stages/steps column 202 shows the different domains where a product may be processed and maintained. For instance, livestock such as a pig may be raised in one domain (e.g., a farm), then moved to another domain (e.g., processing 1 facility) and transformed into cuttings. A cutting from this domain (e.g., processing 1 facility) may be moved to yet another domain (e.g., logistics) where the distribution to different domain is determined. Then the cutting may be distributed to still another domain (e.g., processing 2 facility) where the cutting may be processed into ham product. The ham product may be moved to another domain (e.g., supermarket).

The product code column 204 shows the different product codes or identifiers assigned to the product as it moves from domain to domain. For example, at the farm the livestock may be assigned codes p001 and p002, etc. At the processing 1 facility, the cuttings from the same livestock may be assigned c001 and c002, etc. At the processing 2 facility, the product made from the cuttings may be assigned h001 and h002, etc.

The EPCIS standard events column 206 shows the different events generated at different domains. For example, at the farm domain, an add object event may be generated as each livestock is added into the farm domain. Also, an observed object event may be generated when a livestock exits the farm domain. At processing 1 facility, add object event may be generated when a cutting is added. An observed object event may be generated when the cutting enters a different domain. The entries in the "EPCIS Standard Events" column in FIG. 2 have three elements: Event type, e.g., add, observe; Product code, e.g., p001 for pig 1, p002 for pig 2; Action, e.g., entry or exit to a domain. So, for example, the first event in the column shows Product p001 was added to Farm 1. Also, product 002 was added to Farm 1. Then, p001 exit from Farm 1 was observed. At the processing 2 facility domain, an add event object may be generated as the ham products are produced from the cuttings. The "EPCIS Standard Events" column shows that three events are associated with the Processing 2 domain. Product c001 entry to PROC is observed, Products h001 and h002 exit from PROC are observed.

The trigger/action column 208 describes how a transition event may be generated based on other events. For example, Trigger 1 was made when product c002 exited from the location having code SH2. It triggers a rule defined as Action 1 that maps a cut meat with a live stock, e.g., c001 and c002 came from p001 and p002. Additionally, it records the information in ITS in the form of a transition event which shows the mapping between source and target product code.

Extended EPCIS events column 210 shows the transition events generated by the actions in response to the triggers in the trigger/action column. The transition event includes fields such as the source EPC and the target EPC. This way it is possible to trace from an output product all the way back to a source product by following the transition event links across boundary borders. Links may be followed by matching the source and target EPCs.

Identifying Source Material Associated with Food Products Using Bill of Material To identify actual sources from which contaminated food product items were derived, the present disclosure, in another aspect, discloses pinpointing or detecting sources of food by using bill of material (BOM). BOM includes a list of raw materials and the quantities of each needed to manufacture a final product. BOM also may include a list of sub-assemblies, intermediate assemblies, sub-components, components, and/or parts, that were generated from the raw material and that make up the final product. In one embodiment of the present disclosure, food sources are linked with a food product by BOM, the sequence number of selected food product is recorded, the sequence number (as opposed to time stamp) range of food source units is generated based on the bill of material, and the food sources having sequence number within the estimated sequence range are identified.

Figure 3:
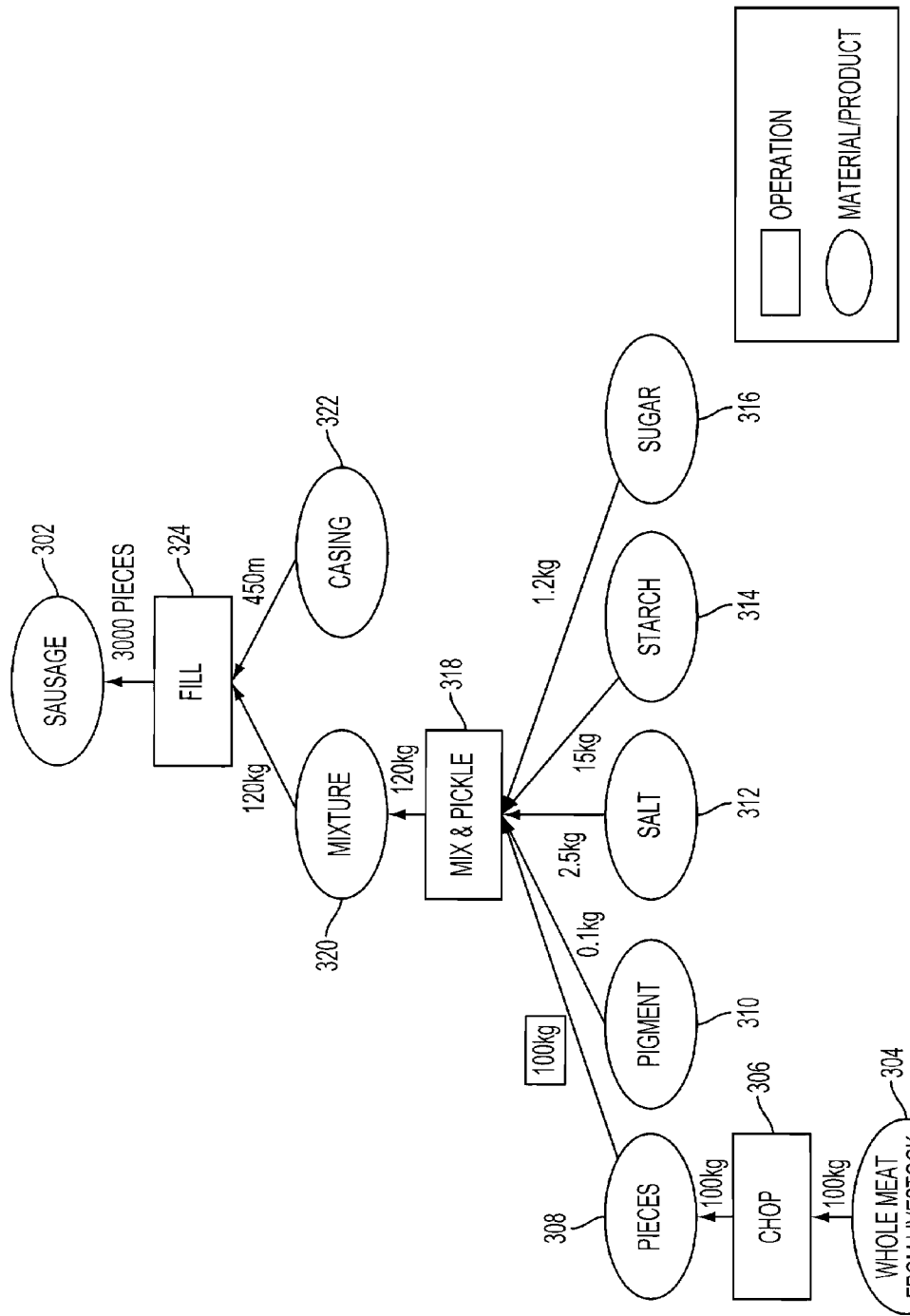
FIG. 3 is illustrates an example BOM of food product.

FIG. 3 is illustrates an example BOM of a food product. The food product shown as an example is sausage 302. The production of sausage 302 may start from whole meat rendered from livestock 304, which is processed at 306 into pieces 308. The pieces 308 may be mixed and pickled at 318 with additional raw material such as pigment 310, salt 312, starch 314, and sugar 316. The mixture 320 is filled at 324 into a casing 322, and sausage is produced as the final product. The BOM also records or includes the amount of each material used to make the final product 302. The amounts of material are shown on the edges of the nodes connecting the nodes of the BOM graph. The example of FIG. 3 shows that 120 kg of mixtures 320 filled into 450 m of casing 322 produced 3000 pieces of sausage 302.

Figure 4A:
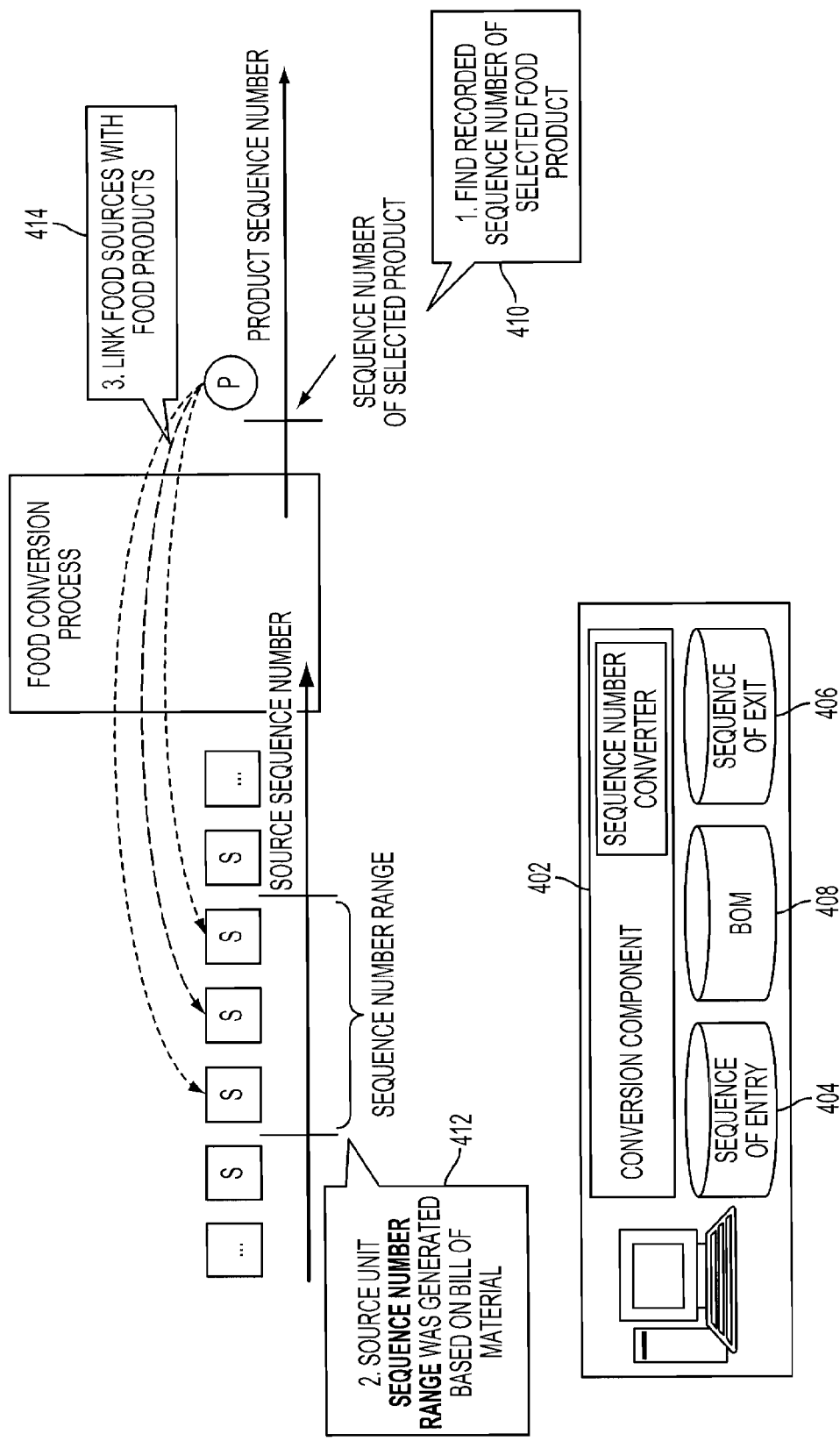
FIG. 4A illustrates components and a process that uses BOM to identify source(s) of an end product in one embodiment of the present disclosure.

FIG. 4A illustrates components and process that use BOM to identify source(s) of an end product in one embodiment of the present disclosure. A sequence of entry component 404 records the sequence number of each source. A sequence of exit component 406 records a sequence number of each end product. The BOM component 408 keeps the relationship between sources and products and production rate information. When the sources of a product need to be determined, the sequence number of the product is determined at 410. A conversion component 402 calculates the range of sequence number of source units at 412. A conversion component 402 maps end products with sources. Thus, source units are determined according to their sequence numbers at 414.

Figure 5:
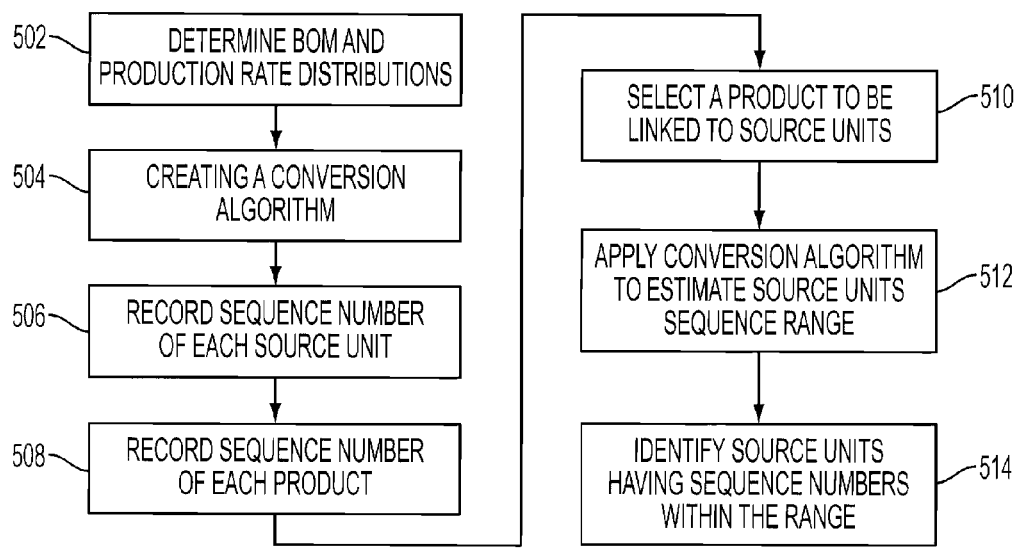
FIG. 5 is a flow diagram illustrating the method steps in one embodiment of identifying the source of an end product in one embodiment of the present disclosure.

FIG. 5 is a flow diagram illustrating the method steps in one embodiment of identifying the source of an end product in one embodiment of the present disclosure. At 502, BOM and production rate distributions are determined. The BOM (Bill Of Material) is a data model that explains relationship between source units and products, including what is produced with what and how many source units are required to produce a product (production rate), for example, as illustrated and explained with reference to FIG. 3. Using such data model, material and production rate distributions associated with a product may be retrieved.

At 504, a conversion algorithm is created. The conversion algorithm is for identifying source units associated with an end product of interest. A conversion algorithm contains several parameters (e.g., acceptable confidence level). The parameters may be set when such an algorithm is created. Examples of conversion algorithm are described further below.

At 506, each source unit's sequence number is recorded. A source unit is one type of an input (there could be multiple input types) of the food conversion process which is shown at 412 in FIG. 4A. For example, in manufacturing, each source unit is assigned a sequence number. For instance, a device may be attached to a product manufacturing line entry which can count the number of input source units, increase the sequence number by one once a source unit is detected as input, and record the sequence number (the count) and associate the sequence number with the source unit identifier into an information system. For example, four input source units entering a domain may be assigned sequence numbers S1, S2, S3 and S4.

At 508, the sequence number associated with each end product processed from the source units is recorded. The sequence number automatically increases by 1 when a product is produced. For example, if seven end products are produced from the four source units as given in the above example (S1, S2, S3, S2), those end products are assigned sequences numbers T1, T2, T3, T4, T5, T6 and T7. Thus, in one embodiment, the source units and target units (end products) have separated sequence sets.

The steps 502 to 508 show a procedure for setting up the data (i.e., source unit to end product associations using sequence numbers) in one embodiment. Once setup, the data may be used offline to perform analysis for tracing sources of an end product.

At 510, a product whose source unit needs to be determined is selected. That is, the selected product is the one of interest whose sources are desired to be identified.

At 512, the conversion algorithm created at 504 is applied to estimate the sequence range of the source units associated with the product selected at 510. The conversion algorithm automatically calculates the sequence range with a given input, which is the end product's sequence number. Recall that at steps 506 and 508, the sequence numbers were assigned to the source units and end product units. At 512, by using an algorithm, correlation or linking of an end product to a source unit is performed.

The conversion algorithm identifies the source units (and their sequence numbers) for an end product (and its sequence number) at 512. For instance, given a production rate of a manufacturing machine, BOM, and training (empirical) data which has known mapping between source unit sequence numbers and end product sequence number, a distribution function (also referred to as a probability distribution or density function) is determined for a given production rate and BOM using the training data. The distribution function may be modified as the production rate and/or BOM model change. For example, the parameters of the normal distribution are the mean and the variance as the graph of the associated probability density function is bell-shaped with peak at the mean and tail shape determined by the variance. As the production rate and the BOM model change, the mean and the variance of the distribution function also may change. The exact function and mapping between the mean/variance and the production rate/BOM model is determined by the training data, for instance, as part of the mapping between source unit sequence numbers and end product sequence number.

The distribution function can be validated by using simulation techniques. There may be multiple distribution functions, one for each source unit types, e.g., one for meat pieces, another one for starch, yet another one for sugar, etc.

Figure 4B:
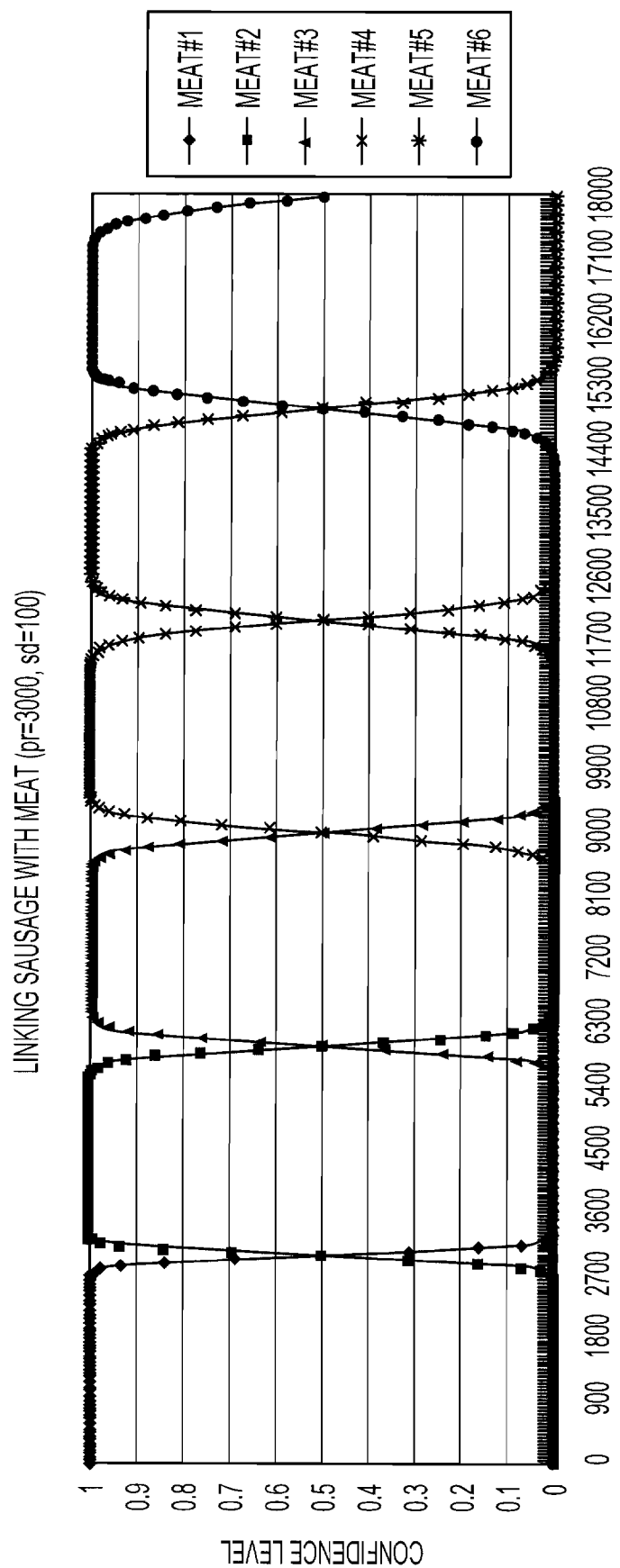
FIG. 4B shows an example distribution function that maps source to end products by sequence numbers in one embodiment of the present disclosure.

Using the distributed function, the conversion algorithm can identify source unit sequence numbers for an end product statistically, as shown, in FIG. 4B. Suppose the sequence number of the end product is 10800. Then using the distribution function shown in FIG. 4B, the conversion algorithm determines that meat #4 was used to make this product with 100% confidence. However, if the sequence number of the end product falls between 11700 and 12600, the conversion algorithm may determine the source units as being some of meat #4 and some of meat #5 with some confidence level depending on the exact end unit sequence number allocation in the distribution function. As noted above, there may be multiple distribution functions for each different source types, and the conversion algorithm may identify source units used in an end product unit with probability or confidence level in a similar way.

A probability distribution function may be generated empirically by using historical data. For instance, mean, standard deviation, and other parameters that characterize the chosen probability distribution function (e.g., normal distribution function) may be computed from historical data. A probability function may be also generated using simulation, for instance, by starting with a simple function requiring little assumption about the function, and refining it iteratively.

At 514, one or more source units having sequence number within the range are identified. For example, by querying the "sequence of entry" component (in FIG. 4, at 404) with the sequence range calculated in the previous step (512), the source units can be identified.

The method of the present disclosure for inferring on food supply network may be applied to any manufacturing process, in which for example, a machine processes one or more types of source products into one or more types of target products. Both source products and target products are separated into discrete objects which can be labeled with an auto-increased sequence number before consumed and produced. The object is the level of granularity to trace. Objects of source product can have different quantity in weight. When different source objects of the same type are mixed in machine for processing, it may decrease the confidence level of determining correlation of target and source objects. If different source product objects are mixed then they should be taken as a combined object. The machine processes all source objects in sequence. It may be assumed that the quantity of leftover in the machine is small enough to allow required confidence level in determining the relationship of target products to source products. The method of the present disclosure infers the relationship between source materials and target products, statistically. For example, because of meat leftover in machinery and the variations in its mechanism movement, it may not be possible to infer the relationship with 100% certainly. The uncertainty can be expressed statistically, i.e., by using confidence level. For example, with 90% confidence, the method may conclude that a sausage piece of identifier 001 is made of meat from pig of identifier 007. The probability that a sausage piece 001 is made of meat from pig 007 is 0.9.

In one aspect, production rate is treated as a random variable having known distribution (typically normal distribution). A is source product A. B is target product B. Then the objects quantity Z of B that a unit weight of product A object can produce is following the normal distribution $Z=[N(\mu,\delta)]$, in which $\mu$ is the average number of product B objects that A (unit weight) can produce and $\delta$ is the variance. If an object A's weight is W, then the quantity of B it can produce is $Z*W$. Z is the production rate (i.e., how many units of products can be produced with one unit of source). It is treated as a random variable so that it is calculated with certain confidence level.

The following is an example of a conversion algorithm that is created. The algorithm computes the range of sequence numbers of source units.

Let $p(i|x)$ be probability that product i was produced by source unit x, then it can be calculated as the following where $\Phi$ is cumulative distribution function of the production rate distribution:

$$p(i\mid x) = \begin{cases} \Phi'_{i\mu,x\sigma^2}(i) - \Phi'_{(i-1)\mu,(x-1)\sigma^2}(i) & (i>1) \\ \Phi'_{i\mu,x\sigma^2}(i) & (i=1) \end{cases}$$

$$\Phi'_{\mu,\sigma^2}(i) = 1 - \Phi_{\mu,\sigma^2}(i) + \Phi_{\mu,\sigma^2}(0)$$

The confidence level can be further increased when considered batch-end constraints.

In another aspect, a conversion algorithm may utilize simulation-based approach. For instance:

Having,

A1, A2, . . . An as source product objects 1 . . . n

B1, B2, . . . Bm as target product objects 1 . . . m $Z=[N(\mu,\delta)]$ which is the distribution of produce rate from unit weight A to quantity of object B; '[ ]' means round. That is, $Z=[N(\mu,\delta)]$ which is the production rate producing A to B.

Problem,

Given $y(1<=y<=m)$, calculate the possibility of each A object that could produce By, i.e., a target object.

Algorithm,

C[1 . . . n]=0; //C[1 . . . n] is an array to record the hit count of each simulation of A1 . . . n for By For a large iteration N, in each round, do Set s=0; t=y;

While (t>0) do s++; Simulate once $Zs=[N(\mu,\delta)]*Ws$; t-=Zs;

C[s]++; //C[s] hit once means in this simulation round, As produces By

P[1 . . . n]=C[1 . . . n]/N //P[1 . . . n] is the possibility of A1 . . . n to produce Bs The above conversion algorithm can be explained as follows.

Assumption: Assume source food product is input as separate objects which can be counted in sequence, and also the target food product is output.

The problem is to compute the trace relationship between input and output with a level of confidence. A distribution function of the translation from source to target by weight may be obtained from the subject matter expert's (SME's) experience based on the current process, i.e., the range estimation of the relationship between the quantity of the source, and the target produced by the source.

The conversion algorithm uses simulation based method to compute the possibility of a target food object to the source food object. The algorithm executes the following sub steps a large number of times and records the hit times of target objects that belong to source objects.

Steps: (description of the algorithm)
Step 1: Get an instance number from the random distribution function for source object 1, see how many target objects it generates and correlate those target objects with source object 1.
Step 2: For each source object, repeat the Step 1, and so all the correlation of target objects with source objects are established.
Step 3: The correlation between source and target objects is accumulated by hit time within the large loop of simulation.
Result: (the explanation of the output of the algorithm)
With the hit times and the total number of simulation loop, the possibility of correlation between source and target can be computed.

Determining Aggregate Hazard Impact for a Food Traceability Network

In another embodiment of the present disclosure food hazard/risk analysis model may be provided that enables decision makers (e.g., government or enterprise) to perform qualitative as well as quantitative analysis to determine cause and impact of food hazard.

There are generally two typical decision makers or business scenarios, although the present disclosure does not limit to only those two. One is food a manufacturing enterprise; the other is a food safety related government or administration agencies. Food enterprises are interested in the hazard exposure analysis, that is, food enterprises may be interested in knowing the outbreak of some hazards in markets, trying to understand whether and how they will impact the enterprise, or what kinds of hazard will have impact on the enterprise. To government, once a food safety event occurs, the government and administrators or the like would want to quickly find the root cause for this event and determine the involved range of food brands and/or lots that are at high risk. Such analysis helps in the recalling process and allocating responsible entities for the food safety event.

In one embodiment of the present disclosure, the food hazard/risk analysis may be based on three categories of models: 1) Traceability model or information to record the trace of a product or product lot from primary producers to end consumers; 2) Daisy chain model to setup the relationship between risk factor, risk event, material (product), business process, mitigation approach and organization; 3) Hazard dynamics about the growth/mitigation over time under different conditions (e.g., temperature, moisture). The models may be implemented as a computer data structure or the like.

1) Traceability Model

Figure 6A:
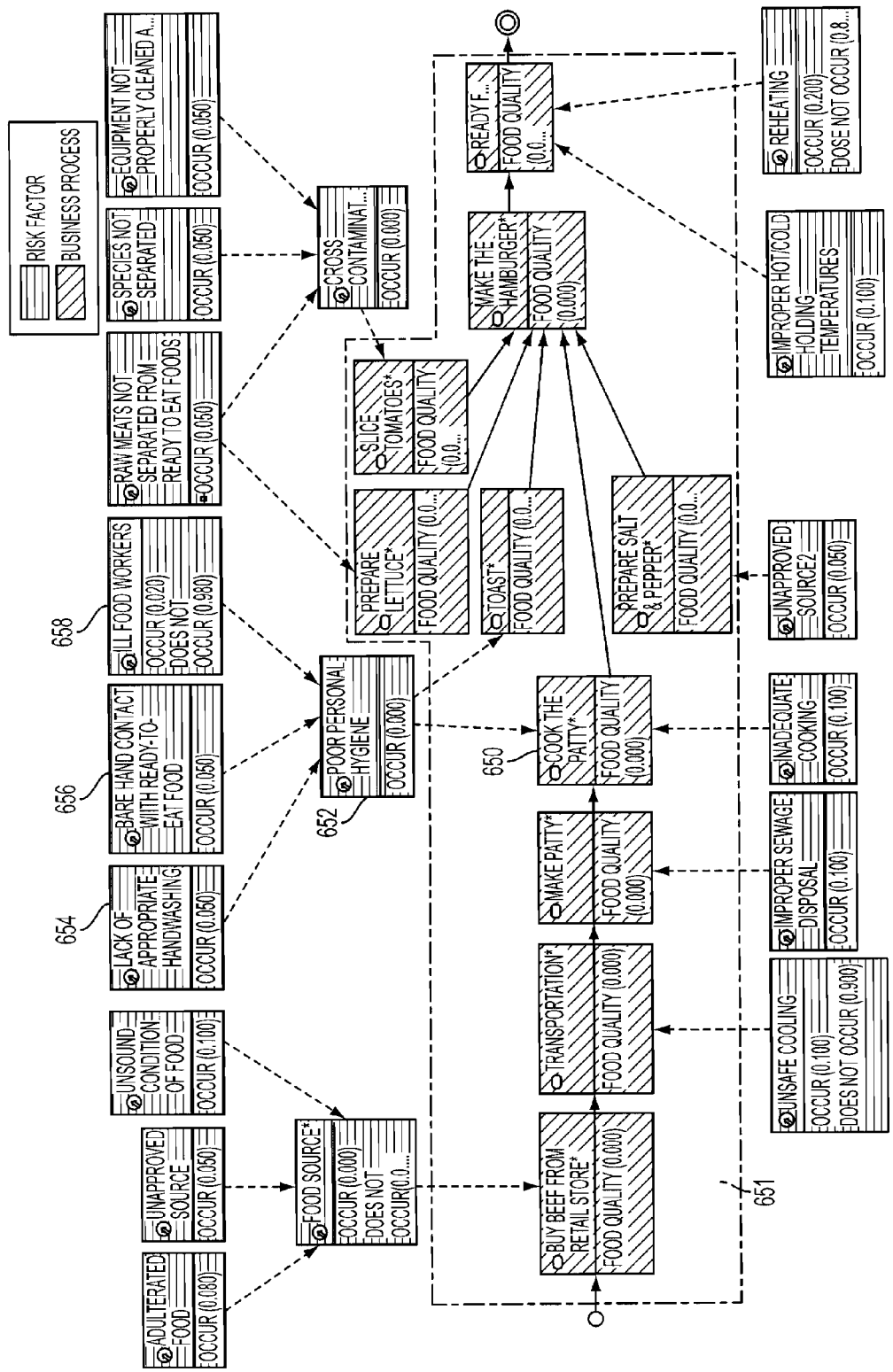
FIG. 6A shows an example daisy chain model for enabling food hazard or risk detection in one embodiment of the present disclosure.
Figure 6B:
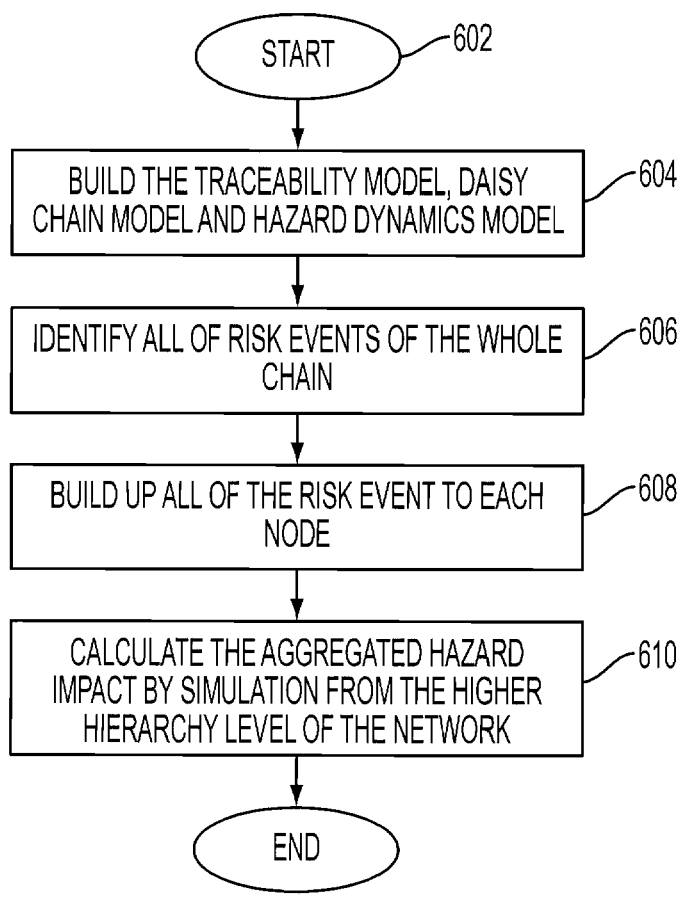
FIG. 6B is a flow diagram that illustrates hazard impact calculator method in one embodiment of the present disclosure.
Figure 6C:
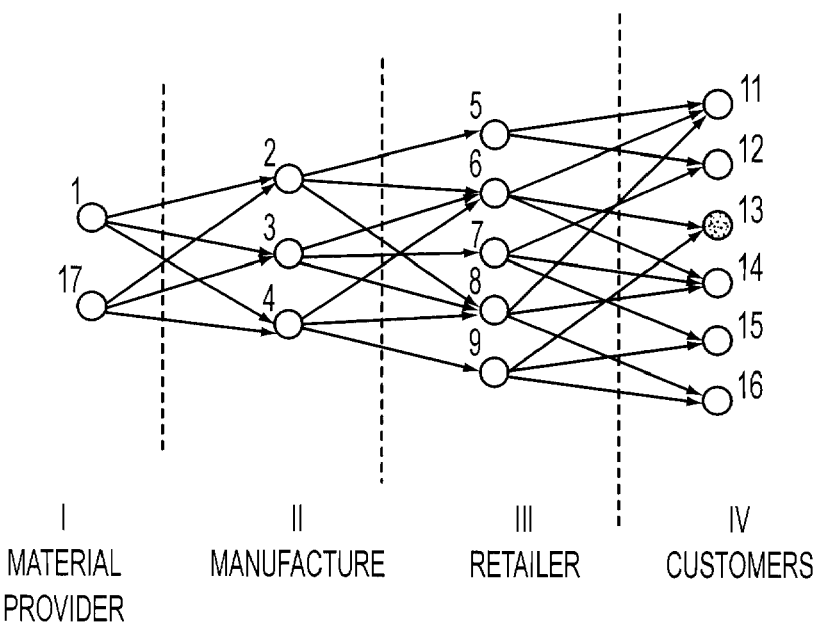
FIG. 6C illustrates food traceability network in one embodiment of the present disclosure.

Traceability model construction may be based on BOM (bill of material) as well as transaction record as described with reference to FIGS. 1 and 2. An example of a traceability model (also referred to as traceability network model) is shown in FIG. 6C. Each node (e.g., 1-17) shown represents a processing facility (or a stage shown in FIG. 2 at 202). The traceability network model is arranged in a hierarchical structure in one embodiment. The lines with arrows illustrate the flow of products from one node (e.g., facility or stage) to another.

2) Daisy Chain Model

Figure 6D:
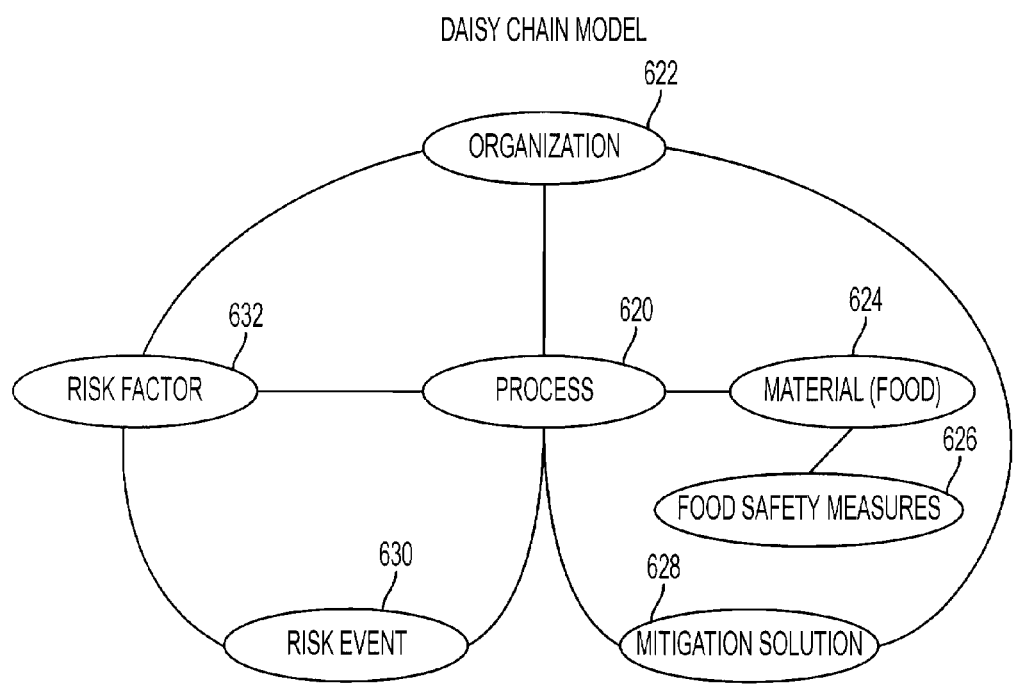
FIG. 6D illustrates a daisy chain meta-model of food hazard that enables qualitative analysis for inferring across different elements in an operation process of producing the food from its raw material in one embodiment of the present disclosure.

A daisy chain meta-model is shown in FIG. 6D, which may include a process model 620, an organization model 622, a risk factor model 632, a material model 624, a risk event model 630, a mitigation solution model 628, a food safety measure model 626, and other items. In the meta-model, a process is a hub of the connection(s) between different models (e.g., organization 622, risk factor 632, risk events 630, material 624, etc.). The process model 620 includes processes associated with an organization specified in the organization model 622. The risk factor model 632 includes risk factors associated with an organization and its processes. The risk event model 630 includes risk events associated with an organization and/or its processes. In one aspect, risk factors may be considered as causes (e.g., as shown in hierarchical model example in FIG. 6E); risk events may be considered as effects (e.g., Salmonella outbreak, food poisoning in specific locale). The material model 624 includes the products or material associated with an organization and/or its processes. The food safety measure model 626 includes food safety measures taken or defined in or associated with the material associated with an organization and/or its processes. The mitigation solution model 628 includes mitigating solutions associated with an organization and/or its processes.

For example, to find the risk factors related with an organization, the methodology of the present disclosure may identify related processes 620 of an organization 622, then identify related risk factors 632 of these processes 620 via the links from 622 to 620 to 632. When there is a hazard or risk factor, internal searching may be performed via the daisy chain meta-model to identify the related process. Then through the process model 620, hazard or risk factors of other model elements (e.g., product, organization, etc.) linked to the process may be identified or inferred.

In the daisy chain meta-model, the lower level enterprise's risk factor (e.g., beef quality from a meet processing plant) may be associated with the material risk event of down-flow enterprise (e.g., a hamburger making company). Such inter-enterprise relationships through associated risk factors and risk events may be captured in the traceability model in FIG. 6C.

The daisy chain meta-model shown in FIG. 6D and an extended BOM (Bill of Material) model may be used to further enhance or build the traceability model in FIG. 6C as follows. Unlike the traditional BOM, which captures operations and materials limited to an enterprise, the extended BOM model of the present disclosure may show operations, materials and their linkage across all the enterprises contributing to an end product, e.g., sausage. This extended BOM model also may be used to build or enhance the traceability model at the operation and material level. For instance, to build the traceability model at the enterprise level as shown in FIG. 6C, the methodology of the present disclosure may use the daisy chain meta-model shown in FIG. 6D to translate and consolidate operations (or processes) 620 and materials 624 into enterprises (or organizations) 622. The linkages among enterprises in the traceability model in FIG. 6C may be inferred and drawn by following the risk factors 632 and risk events 630 associated with the operations (or processes) 620 given in the extended BOM model. Note that the relationship between a risk factor and a risk event is that of cause and effect. Therefore, a risk event associated with a lower-level enterprise in the traceability model can become a risk factor to the next level enterprise.

Figure 6E:
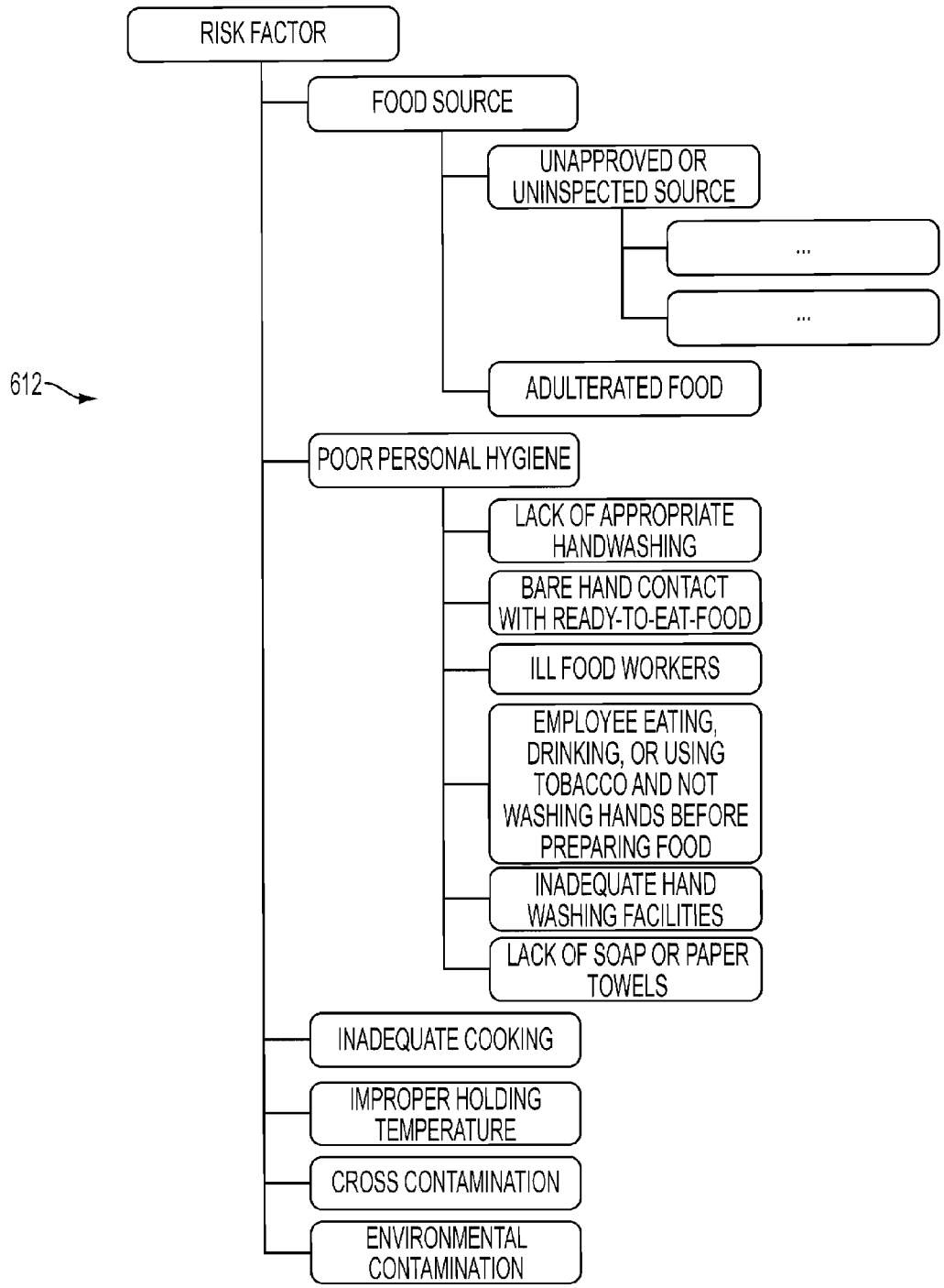
FIG. 6E illustrates elements in an operation process of producing the food organized into a hierarchical structure in one embodiment of the present disclosure.

Each model element in the daisy chain meta-model can be organized into a hierarchical structure with multiple levels. FIG. 6E illustrates elements in a process of producing food, organized into a hierarchical structure. Each model (e.g., organization, risk factor, risk, material, etc.) may be organized into a hierarchical structure with levels such as category, sub-category, component, element and others. Depending on a specific industry, categories may be broken down to lower levels, and the number of levels in a hierarchical tree may be variables depending on the details needed. The hierarchy shown at 612 is an example of risk factor (632 FIG. 6D) model. The example hierarchical structure of the risk factors model shown has a 3-level hierarchy. "Poor Personal Hygiene" can be called as a category. "Lack of appropriate handwashing", "Bare hand contact with ready-to-eat-food", etc. are sub-categories.

A daisy chain model may be adopted within an enterprise or an organization, and shows how the external products and internal organization operations impact the outbound food quality (or food hazard levels). A sample daisy chain model is shown in FIG. 6A, which shows the relationship for hamburger making process with related internal operational risk factors as an example. In FIG. 6A, the boxes connected by solid lines with arrowhead denote the organization process, which describe a hamburger making process. Organization processes are shown at 361 in FIG. 6A. Each organization process may have one or more risk factor associated with that process (for example, shown as connected with dotted lines with arrowhead). For example, in the process "cook the patty" 650, there is a risk factor called "Poor Personal Hygiene" 652, which in turn are divided into three detailed risk factors such as "lack of appropriate handwashing" 654, "bare hand contact with read-to-eat food" 656, and "ill food workers" 658. FIG. 6A shows other organization processes and associated risk factors linked in a manner such that one component in a daisy chain model can be traced from or to another component in the daisy chain model.

Generally, as the daisy chain model covers more organizations (company A) and/or more food product (Food B), instances for those organizations and/or food products are added to the model. In addition, the instances of other entities (e.g., processes, risk factors, etc.) related to the added instances (e.g., company A and/or food B) may be added to the model for the analysis. While the instances in the model can be added, modified and deleted, the model itself remains the same. For a particular traceability and hazard impact analysis, the portion of the instance set of the model relevant to the analysis may be extracted (e.g., for a particular company, food product, or risk).

3) Hazard Dynamics Model

Figure 6F:
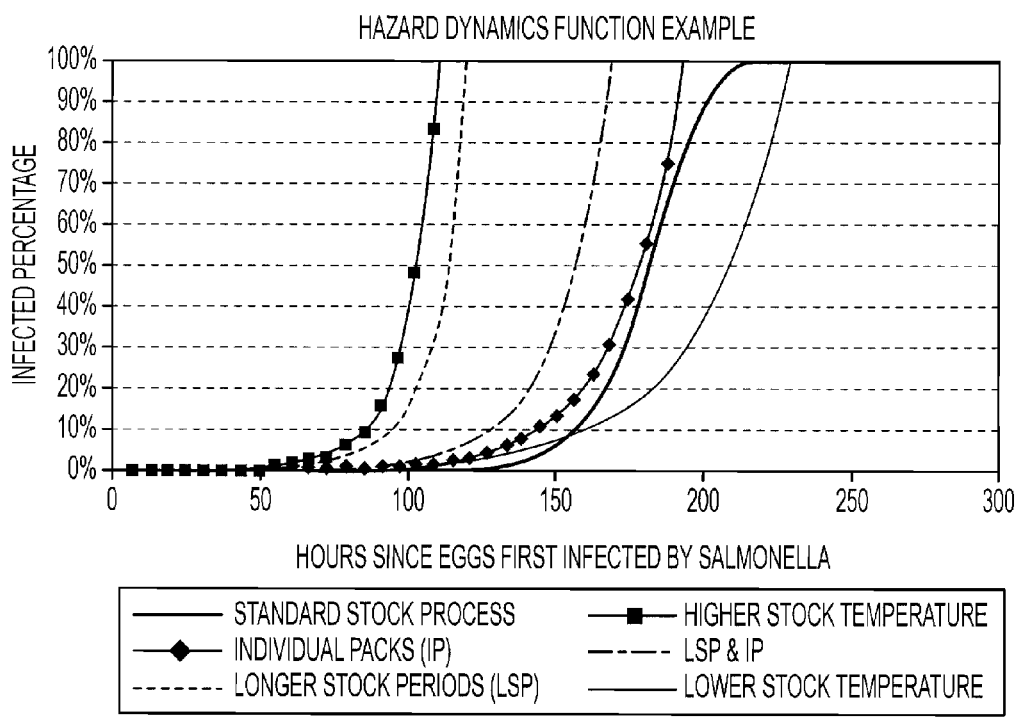
FIG. 6F illustrates an example of a hazard dynamics model that describes the dynamics of a single hazard over time and environment in one embodiment of the present disclosure.

A hazard dynamics model shows hazard dynamics, i.e., the growth and/or mitigation over time under different conditions (e.g., temperature, moisture). A sample hazard dynamics model is shown in FIG. 6F, which illustrates the percentage of infected eggs under different stock conditions (e.g., stock temperature, packing, etc.) after an egg has been infected by Salmonella. Hazard dynamics models may be built based on specifications provided by a domain expert from experience, experiments, and other factors.

The above-described models may be implemented as any type of data structure or the like and stored in a computer storage medium such as memory device and/or hard disk.

The three categories of models function complementarily in performing the aggregate hazard impact analysis in one embodiment of the present disclosure. For instance, a traceability model (e.g., described above with reference to FIGS. 1 and 2, and also shown in FIG. 6C) tells about the product flow across enterprises or organization border. A daisy chain model (e.g., shown in FIGS. 6A, 6D and 6E) may be adopted within an enterprise to model the impact relationship between product, risk factor, risk event, organization process, mitigation approach, and/or others. A hazard dynamic model (e.g., shown in FIG. 6F) describes the dynamics of a single hazard over time and environment.

In one aspect, the qualitative analysis may be performed based on a well-organized model (e.g., the combination of the above three models) that links the hazard factors with process and organization. Qualitative analysis may be performed on a root-cause relationship. A root-cause relationship in food supply chain may include two perspective: 1) Root: When there is a food safety issue/hazard, one needs to figure out the original source of the issue, 2) Cause: When it is confirmed that there is a food safety hazard, one would like to know the products that have been impacted or will be impacted by the identified food issue. For example, it is possible to discover impact range of a hazard over the entire food traceability network. An impact range of hazard or hazard impact range refers to a range of products, for example, brands/lots of product that are affected by a hazard incident. For example, when it is known that one batch of cattle in a farm which have been sold one week ago were diseased, one would like to know which brands/lots of hamburger have the food quality issue. Food traceability network includes the product flow from origin facility to destination or target facility, for instance, from a farm, to a meat processing plant, to a hamburger enterprise, and even to a fast-food retailer.

Qualitative analysis of the present disclosure may include the following hazard analysis. A hazard exposure analysis may identify all hazards that an enterprise is being exposed to. For example, an organization may be viewed a collection of processes and operations. So, for example, if all hazards exposed by all the processes of an organization are identified, all hazards the organization is exposed to may be identified. A hazard impact target analysis may identify all enterprises that are impacted by a given hazard. Hazard tracing analysis may identify the source of a given food safety event. The qualitative analysis may be based on the traceability model and daisy chain model described above. For hazard tracing analysis, a daisy chain model is used to identify the related inbound products. Then, the product flow of the related inbound products is identified using the traceability model. For each specific food chain node (e.g., meat processing plant), a daisy chain model may be used to drill down to identify related risk factors and/or events. Hazard exposure and impact target analysis may be based on the daisy chain. For example, there may be two general scenarios:

1) If the daisy chain model is constructed for each enterprise, then the hazard exposure analysis may include listing all risk factors in the risk factor models of a given enterprise. Risk impact targeting analysis may include searching a process in the enterprise that contains the given hazard in the risk factor model. As mentioned above, "risk factors" are causes of risks. A hazard is considered as a risk or a risk event.

2) Otherwise, for hazard exposure analysis, the analysis may include identifying all organizations related with an enterprise, then finding organization processes related with each organization, at least listing all risk factors related with these processes. For hazard impact target analysis, the process is the reverse. That is, the analysis may include first identifying related organization processes of a given hazard through the daisy chain model, then searching organizations related to or associated with these organization processes. All such identified organizations are summarized.

In another aspect, a quantitative evaluation of the impact of a hazard may be performed. The quantitative analysis of the present disclosure in one embodiment calculates the degree of the relationship and hazard level based on the qualitative analysis. The qualitative analysis was described above as providing the root-cause and traceability relationship. The calculation flow for the quantitative analysis in one embodiment is shown in FIG. 6B, which is a flow diagram that illustrates hazard impact calculator method in one embodiment of the present disclosure. At 604, the traceability model, daisy chain model and hazard dynamics model are built based on the organization context of the food chain. At 606, all risk events of the food chains are identified. A risk event refers to an external incident that might happen with some possibility, such as bird flu, Salmonella contamination, etc. The risk events identified at 606 include a subset of all risk events related to the enterprises identified through traceability model analysis. For instance, initially, the risk events may be identified and collected broadly, say, there are Salmonella outbreak in City A, City B, City C—3 risk events. Consider an enterprise (or organization) that is a grocer in City C, which carries food supplied by only local farmers which, in turn, only deals with only local suppliers. If the locality can be confirmed, the risk events in City A and City B can be safely removed from consideration for this grocer. In the following analysis, the method may only focus on the risk event in City C.

The risk events may be based on the user analysis scope or interest (e.g., the user would like to analyze how egg related risk events might impact the whole food chain), or based on real business environment (e.g., there is a bird flu outbreak, government wants to learn the risk distribution). At 608, all risk events to each node are built based on the traceability model and daisy chain model. A node refers to a processing facility or entity or a stage of processing. The risk events related to an enterprise may be built through risk impact targeting analysis discussed above. Within an enterprise, the linking of a risk event with an organization's process is performed through the daisy chain model.

At 610, aggregated hazard impact is calculated by simulation from the higher hierarchy level of the network. That is, according to the traceability model, each node is traversed beginning with the node with source risk events, then to the nodes which are directly connected the node. For each node in the food chain, since each model is in hierarchical structure, the leaf node's hazard is calculated first, then propagated to the top node. Hazard dynamics function is used in the hazard calculation. A stochastic simulation approach also may be adopted.

The following description illustrates an example of the aggregate hazard impact calculation. FIG. 6C illustrates food traceability network. Each node denotes the food entity, for example, node 1 can be a bakery providing different kinds of bread. At each node, the method of the present disclosure may identify all kinds of hazards and their related factors which will cause the specific kind of hazard. For each hazard, the method of the present disclosure may use expert knowledge and/or historical record to get the standard hazard impact model/experience function. Consider salmonella as an example of hazard. Node 1 is a bakery providing different kinds of bread; Node 17 is chicken farm providing eggs; Node 2, 3 and 4 are manufactures for sandwich; and Node 6 is a retailer of quick food.

For node 1, the factors for Salmonella may be temperature (t1), process time (p1), etc. Salmonella content of the bread at Node 1 may be modeled by expert knowledge, and the following result obtained:

$$F_1(\cdot) = F_1(t_1, p_1, \ldots) = \hat{F}_1 \cdot f\left(\frac{|t_1 - \hat{t}_1|}{\hat{t}_1}\right) \cdot f\left(\frac{|p_1 - \hat{p}_1|}{\hat{p}_1}\right)$$

where $\hat{F}_1$, $\hat{t}_1$ and $\hat{p}_1$ are the standard Salmonella content of the bread, standard temperature and process time for the standard manufacture processes respectively. f(.) is S-Function which is an experience function.

Similarly, salmonella content for Node 17 may be obtained by:

$$F_{17}(\cdot) = F_{17}(t_{17}, p_{17}, \ldots) = \hat{F}_{17} \cdot f\left(\frac{|t_{17} - \hat{t}_{17}|}{\hat{t}_{17}}\right) \cdot f\left(\frac{|p_{17} - \hat{p}_{17}|}{\hat{p}_{17}}\right)$$

For node 3, the hazard impact from its parent nodes will be considered with its own risk factors, such as salmonella content from Node 1 and Node 17, the environment of the sandwich process, the cooking time for eggs, etc. The following equation models the salmonella content at Node 3:

$$F_3(\cdot) = F_3(F_1, v_1, F_{17}, v_{17}, e_3, t_3)$$
$$= \hat{F}_3 \cdot g(F_1, v_1) \cdot g(F_{17}, v_{17}) \cdot f(e_3, \hat{e}_3) \cdot f(t_3, \hat{t}_3)$$

where $\hat{F}_3$, $\hat{t}_3$ and $\hat{e}_3$ are the standard salmonella content of the sandwich, standard cooking time and standard environment for the standard manufacture processes, respectively; v is the volume or weight of corresponding products; g(.) is S-Function which is an experience function; and f( ) are also experience functions.

The following illustrates a qualitative analysis of the present disclosure using beef as an example. There may be many different potential traces from a cattle farm to an end consumer, for example:

1) cattle farm->meat processing plant->CPG (Consumer Product Goods) enterprise->retailer store. Here hamburger as the end product sold to a consumer is used as an example.
2) cattle farm->meat processing plant->retailer store. Here raw beef as the end product sold to a consumer is used as an example.

Different farms might have different sales channels and traces. Suppose that a food traceability model from cattle farms to retailer stores has been generated. There may be many risk events that might impact final product quality, e.g., diseased cattle, unqualified cooking machine, unsafe cooling inventory, etc.

1) A Hazard Exposure Analysis Example

A hamburger making enterprise wants to learn all the risk that it faces or may be exposed to. A traceability model helps the enterprise understand the inbound risk from material source (e.g., beef, lettuce, tomatoes, etc.). A daisy chain model such as the one shown in 6A aids the enterprise to better understand the risk factors from the enterprise's operations (e.g., personal hygiene).

2) A Hazard Impact Targeting Analysis Example

A disease is identified with several cattle farms, and one brand cooking machines is found whose temperature is lower than the designed temperature. A government authority or another entity wants to learn which enterprises are impacted by the two hazards.

From the traceability model, the methodology of the present disclosure may trace which meat processing plant the diseased cattle have been sent, and related beef batches that might have food safety issue. Then the beef batches may be traced to identify the CPG enterprise and the retailer that received the affected beef batches. Thus, the government can qualitatively know the impact scope.

For the cooking machines example above, the daisy chain model of the present disclosure may be used to determine which organization operations are dependent on the cooking machines, and the related manufacturing enterprises that employ those operations. Then the identified enterprises may be used in the traceability model to determine the impact range.

3) Hazard Tracing Analysis

Consider as an example, that some quality reports about several batch of beef have been circulated about certain CPGs. A government authority or other entity may use a traceability model of the present disclosure to determine where those CPGs obtain their material sources. In response to determining that most of the material sources come from a few cattle farms, those farms may be tagged as being highly suspicious. Once they are confirmed to have quality issue, then the government authority or another entity can in turn use the traceability model to perform the hazard impact targeting analysis to determine the range of impact throughout the supply chain.

The following description explains the quantitative analysis of the present disclosure in one embodiment using the above examples, for instance, to calculate the aggregate risk to one brand hamburger.
1) A risk event that occurred is identified (e.g., salmonella outbreak), referred to herein as an outstanding risk event.
2) Using a daisy chain meta-model (FIG. 6D), all risk factors associated with the outstanding risk event are identified.
3) Using the daisy chain meta-model (FIG. 6D), all organizations associated with the identified risk factors are identified.
4) The traceability model may be further built up or enhanced using the identified organizations.
5) For each identified organization starting from the lowest-level (e.g., raw material) to upper levels (end product) one level at a time, hazard impact quantity is computed. The computed hazard impact quantities of all identified organizations at a level are combined to form an aggregated hazard impact quantity of an organization at the next level in the traceability model in FIG. 6C. A function that combines the hazard impact quantity may be a linear function, e.g., a weighted average function or others or combinations thereof.

Temporal Context-Based Food Product Transition Network Model

In yet another embodiment of the present disclosure, a temporal and context based food product transition network model and system are provided that not only help investigate the common reason but also discover the exact time point the problem is introduced. In this disclosure, a food product transition network model is also referred to as a food traceability network or food traceability network model or food transition network model. A food traceability network of the present disclosure may support experts to analyze the cause and the problem introducing time point by using timestamp and inference (e.g., by using semantic network technology) on the food product transition network model. The food transition network may be enriched with additional information useful for tracking. The additional information may include but is not limited to, contexts (e.g., feed, farm, logistic, market, etc.), events, timestamps, risk indicators, etc. The method of the present disclosure may effectively consolidate and keep all information useful for food issue tracking in the food traceability network, instrument context to collect information useful for tracking problems, and utilize inference and visualization to help the tracking.

As described above, a food traceability network provides information about the food product and its source, for example, including basic supply chain information such as source ingredients, manufacturing process, delivery process, etc. In the present disclosure in one embodiment, the food traceability network is enhanced by collecting various context data and adding to the trace network. The context data may include data such as where the products or ingredients are produced, mixed, delivered such as plants, vehicles used for delivery, containers used during production, delivery, storage, etc. Additionally, events in each context with timestamps and possible risk indicators and their values in each context may be added. For a contamination problem, the entire augmented information space may be utilized to track the cause(s).

For example, if food product A is found contaminated, the food traceability network provides information including basic supply chain information such as source ingredients, manufacturing process, delivery process, etc. Contexts, events and timestamp information is provided such as shipping container temperature, manufacture plant bacterial count, when the manufacturing and delivery happened, what other products were there in the same context close to that time. For instance, if product A.001 is contaminated, the enhanced food traceability network can tell the problem might have been introduced in a delivery process. For example, through the delivery container temperature data, it is possible to tell that the abnormal high temperature may have caused the contamination and the contamination might have impacted other products in the same container.

Figure 7A:
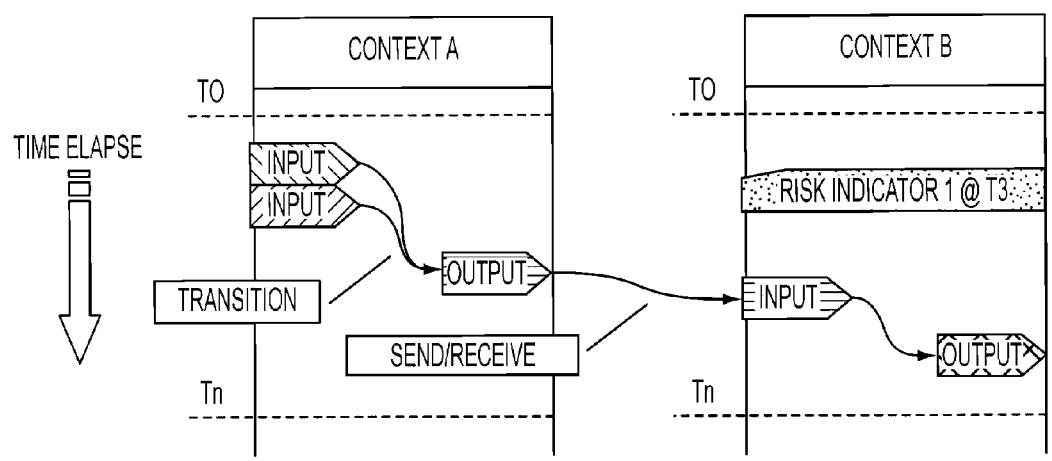
FIG. 7A is an example of a temporal and context-based food product transition network model in one embodiment of the present disclosure.

FIG. 7 is an example of a temporal and context-based food product transition network model. Context is a container with boundary; the area under the title of the context is a swimlane. Left side boundary of the context is for the input, right side boundary is for the output. Within a context, there could be more than one type of input entities and output entities. Each entity is a product set that is identified by the same product code.

The context could be a farm process, logistic process, a processing process or a finer granularity level like a processing equipment in a processing flow. The swimlane is a time-series modeled up down; the vertical position of the input and output entities represents the time that the entities enter or exit the context (timestamp). Within a context, the output and input entities could be of different types of product, and they could be linked in a many-to-many relationship to represent the transition relationship by a confidence level. A confidence level can be assigned based on one or more factors, including, but not limited to, supplier qualifications and track record, nature of the input, the electronic traceability provided on the ingredients supplied. The output entity of a context could be linked to input entity (the same type and product code, but could be different quantity) of another context to represent the send/receive relationship. Risk indicators can be defined in context; risk indicators represent the quantity of a risk factor measure at time T. The context shown in FIG. 7A may be represented graphically on a user interface display and/or as a data structure. An internally computing data structure may be stored in memory to represent such contexts.

Figure 7B:
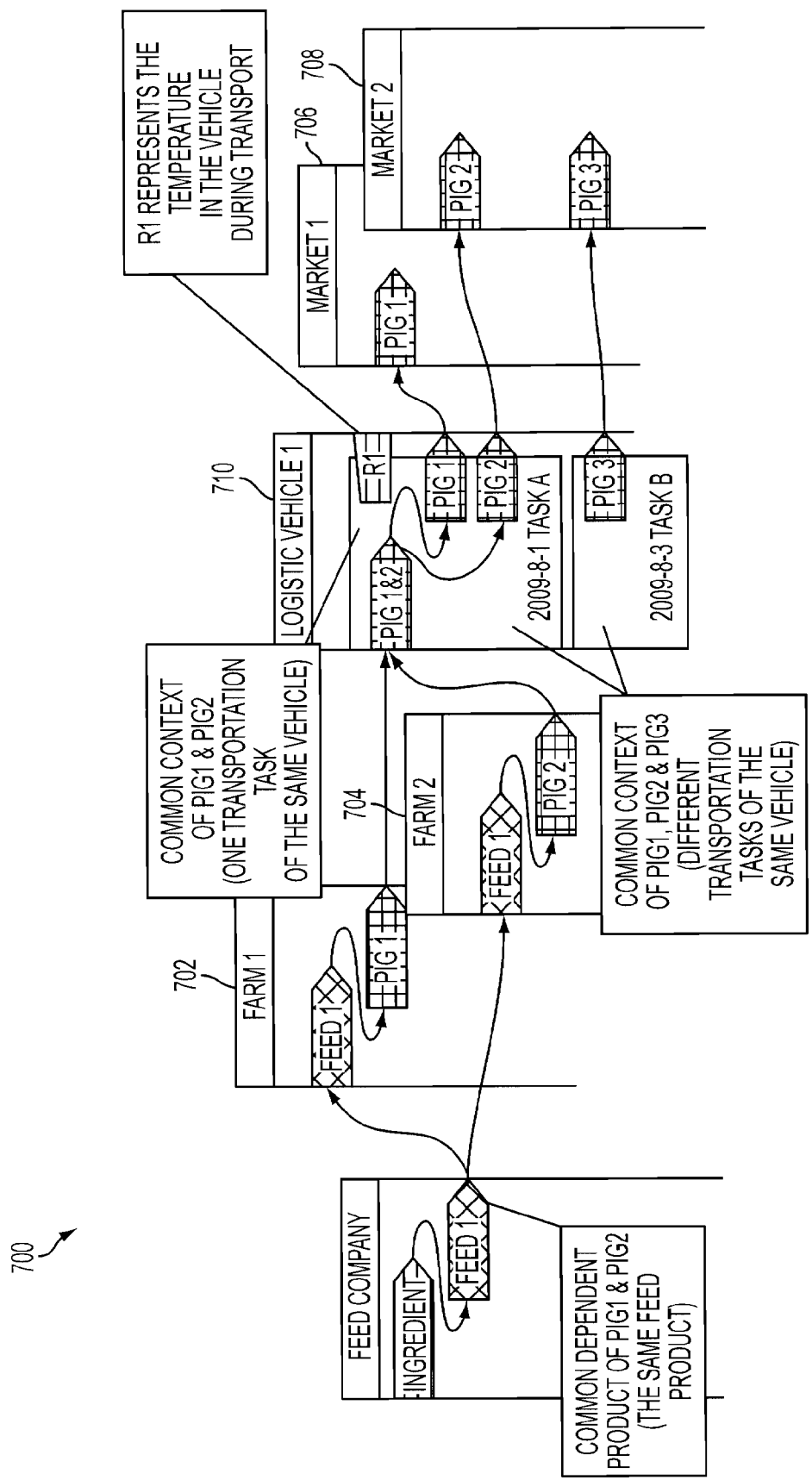
FIG. 7B illustrates a sample scenario that illustrates a temporal and context-based food product transition network model in one embodiment of the present disclosure.
Figure 8:
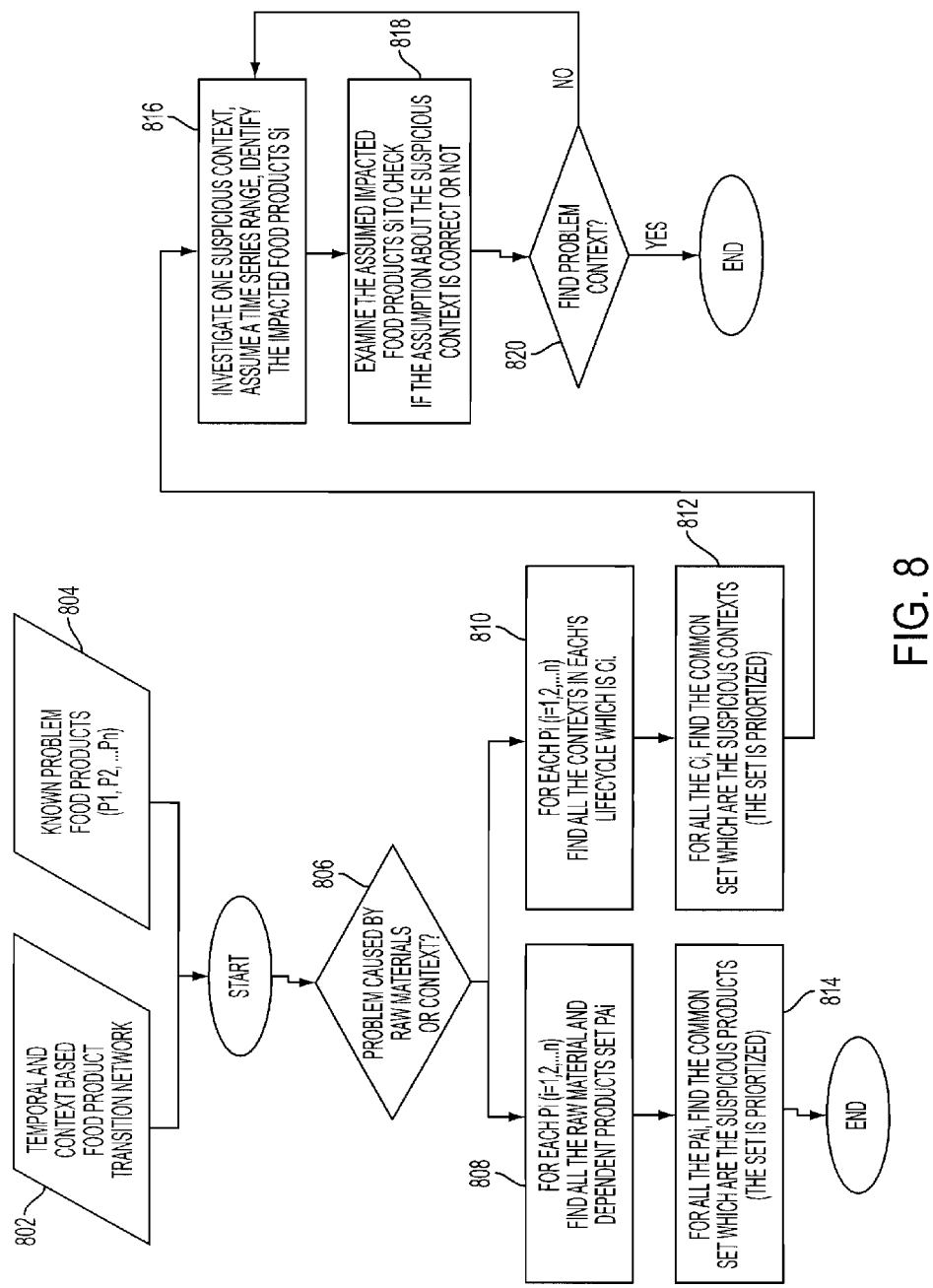
FIG. 8 is a diagram illustrating a method in one embodiment of the present disclosure for using a temporal and context based food product transition network to assist in identifying the source reason of problem food products.

FIG. 7B shows a sample scenario. Farm 1 (702) and Farm 2 (704) use the same feed product to raise pigs, and the pigs are transported to Market 1 (706) and Market 2 (708) by the same vehicle (710). One day, the same vehicle transports Pig 3 product to Market 2 (708). When Pig 1 and Pig 2 are reported to have a problem, the temporal food product transition network model (network model) 700 can be used to help identify the potential cause of separated food safety events. Through the network model, if the problem is caused by some common raw materials or common dependent product, it can be identified, e.g., inferred. For example, Pig 1 and Pig 2 are both raised by Feed 1. Through the network model, if the problem is caused by the context that the products shared or co-existed that may cause the problem, the context could be identified, e.g., inferred. For example, Pig 1 and Pig 2 used to be transported in the same vehicle. This can be discovered by checking the entry/exit time of the pigs to see if they have the common time duration in the logistic context. If the problem is introduced by the Vehicle 1, then by defining a time scope, e.g., from 2009-8-1 to 2009-8-3, the network model can be used to identify (e.g., infer) what other products could be impacted by the same problem, i.e., Pig 3 in this scenario, that was transported using the same vehicle within days of transportation of Pig 1 and Pig 2. When the sample network is extended by including more segments, parties and products in the real-world, the network model may be used in identifying or inferring potential common cause of multiple problem food products FIG. 8 is a diagram illustrating a method for using temporal and context based food product transition network to assist in identifying the source reason of problem food products. Given a known problem in a food product 804, the method uses the data in the temporal and context based food product transition network 802 to determine the possible cause or source of the problem. At 806, food industry domain detection technology may be used to determine whether the problem is caused by raw materials or caused by the production or transport process environment. Briefly, food industry domain detection technology refers to the chemical, biologic methods which are defined to detect the potential issues of specific foods.

If it is determined that that problem is caused by raw materials then the food product transition network may be used to identify the source materials product at 808 and 814. For example, at 808 all raw materials for the problem food product are identified by tracing the food product transition network. All dependent products (PAi), i.e., the source products used to produce the target products and all those products which are used to produce the source products are identified. At 814, for all PAi, the common set which includes the suspicious products is identified. For example, when downstream food products are identified as problematic, for each such downstream food product, the source products on the produce chain can be identified by the transition network. Once all the source products are listed for each product identified as problematic, common sources among the downstream food products may be identified to determine or pinpoint a source material or materials that may have caused the problem.

If is determined that the problem is due to the production or transport process environment, then at 810 and 812 the context information of the transition network may be used to identify the possible context which caused this problem. For example, at 810, all context information associated with the problem product in its cycle is identified. At 812, the common set which is the suspicious context is identified. For example, if it is determined that both products p1 and p2 have problems and that they were both transported by the same transport vehicle, the common suspicious context is that transport vehicle.

The data in the context (like the temperature captured by sensors) could be used with domain knowledge as risk priority foundation, and a specific context could be identified for further investigation. For example, the context could be a container of a shipping vehicle which has sensors to record the status of the container. Thus status, including abnormal container status can be recorded and stored as context information. For example, if a problem is detected with frozen food, then the abnormal temperature recorded of the container that contained the frozen food may signal that the container as suspect.

At 816, for each suspicious context, assume that it is the one causing the problem, and estimate the downstream or final products that could have problems due to that context. At 818, validate whether the assumption about the suspicious context is correct by checking the estimated downstream or final products to determine whether those estimated downstream or final products actually have problems. If so, the assumption that the suspicious context is the one causing the problem is correct. At 820, if the source of the problem is identified in the context, the flow logic in the method ends, otherwise, the flow logic returns to step 816.

Figure 9:
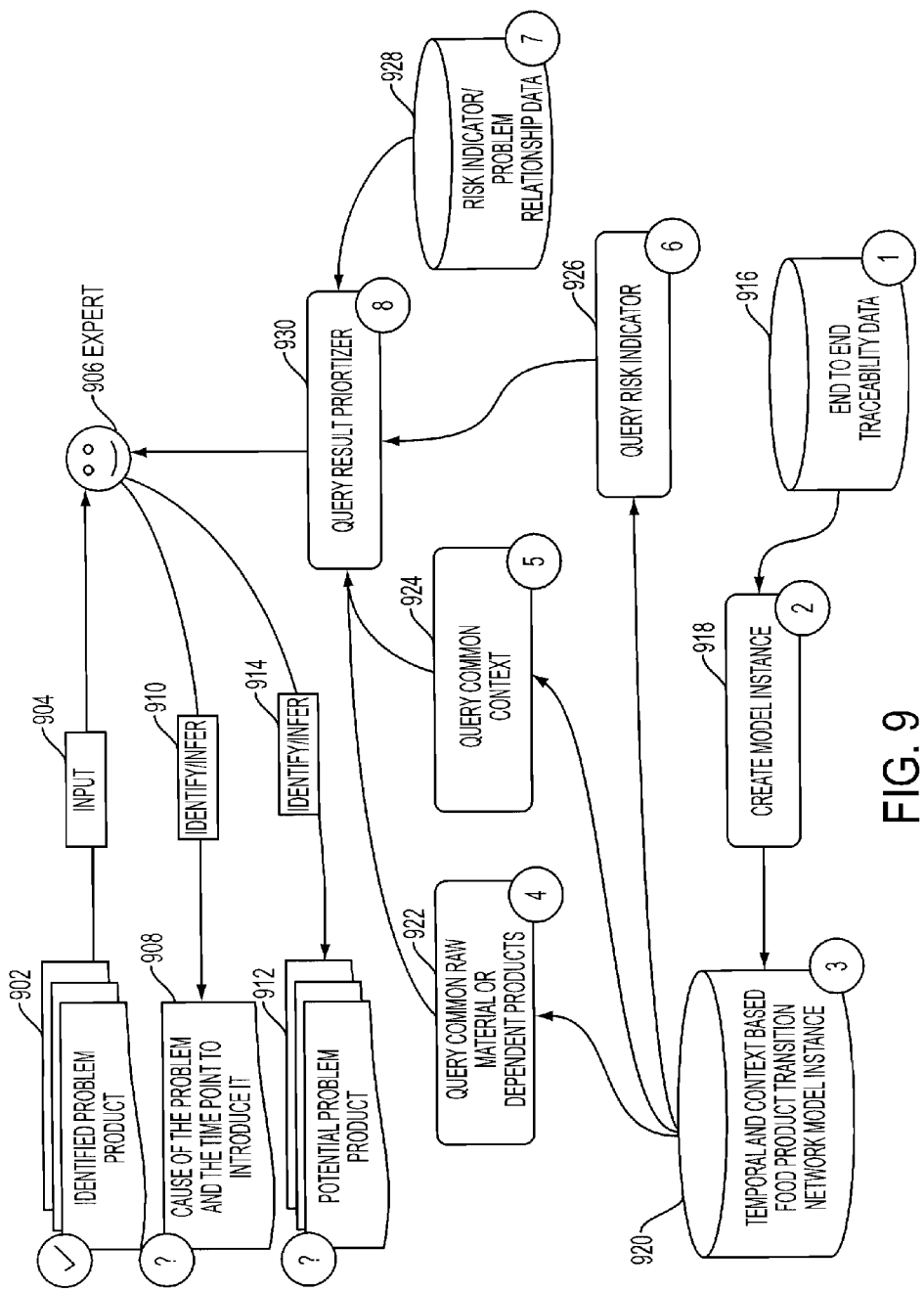
FIG. 9 illustrates components of a system in one embodiment, which use temporal and context based food product transition network and the interactions among them to complete the functions.

FIG. 9 is a system diagram illustrating components of a system in one embodiment the interactions among them using a temporal and context based food product transition network. An end-to-end traceability database 916 stores temporal and context information associated with food products. A model instance creation component 918 processes the information contained in the database 916 and generates a temporal and context based food product network model instance 920. The end-to-end traceability database contains information about the transition of products as events. Once the events include information, e.g., the time, context, etc. the information may be extracted and converted into temporal and context based food product network model instance.

With this model instance 920, a query component 922 may be used to query source materials associated with a food product, based on the linkage between source and target food. Another query component 924 may be used to query the common context of different food products (or different batches), for example, as shown in FIG. 7B.

A risk indicator component 926 may be used to query the information based on risk factors. An example of a risk factor may be the temperature, e.g., an abnormal temperature of a container that is captured by a sensor. If food is sensitive to the environment temperature and it is identified as having a problem, then the abnormal temperature of the container which contained the problematic food may be considered as a risk factor.

Risk indicator and problem relationship data 928 includes the types or kinds of factors that could cause specific problems and associated level of confidence or possibility of the factors causing those specific problems. The information for the risk indicator and problem relationship data 928 may be obtained from subject matter experts or from historical data or others.

A prioritizer component 930 may use the query capability of components 922, 924, 926 and the information from 928 to query and prioritize the query result. For instance, the prioritizer component 930 based on the information about the identified problem product 902 may answers questions that an expert users 906 might have such as the cause of the problem and the time point of the problem 908 and potential problem products 912. Answer may includes the possible cause of the problem (e.g., by raw materials or by context); where it happened (e.g., in some specific context). Through the information provided by temporal and context based food product transition network data, common evidence may be identified based on the identified problem. Risk factors analysis or identification may determine the abnormal context data which can be shown to an expert as reference.

Detecting Irregularity in Food Manufacturing by Using Conversion Pattern

In still yet another embodiment of the present disclosure, a detection system and method may be provided that detects irregularity in food manufacturing. Each stage along the stages of generating the final food product consumes different resources. Generally there are certain relationships between the amount of resources consumed and the production. This relationship in the present disclosure is referred to as conversion rules. Conversion rules provide the trace relationship between products and resources. In one aspect of the present disclosure, the resource consumption data and production data for a final product over a certain or predetermined time span are obtained. The obtained data is verified to determine whether the data is consistent with the one or more conversion rules that are relevant to the final product. If the data is not consistent with the conversion rules, violations may exist, and may be treated as suspect for testing.

Bill of resources (BOR) is a list of all resources (e.g., materials, utilities, even labor) and the quantities of each needed to manufacture an end item. An end item is also referred to as a final product. Compared with bill of materials (BOM), BOR is more like a manufacturing process concept which includes raw materials as input, intermediate and final products as output. BOR is a more general concept which represents relationships of associated elements during the lifecycle of a making of a product. It could be considered that BOR is more about the logical process while BOM is about the physical process.

For instance, considering the feeding stage as a production process of a swine, a sample bill of resources of a swine can be modeled as follows: Pig feed and vaccine are direct resources which have detailed information associated with them, such as the origin, amount, and effective date. In another aspect, the exact value of the amount of feed used to raise the swine is not easy to obtain, for instance because the farmer may not expose the feed purchase and consumption information. So in order to determine the information about the feed more accurately, an indirect resource such as the power consumption of the feeding system may be utilized for determining the amount of feed used to raise the swine.

Figure 10:
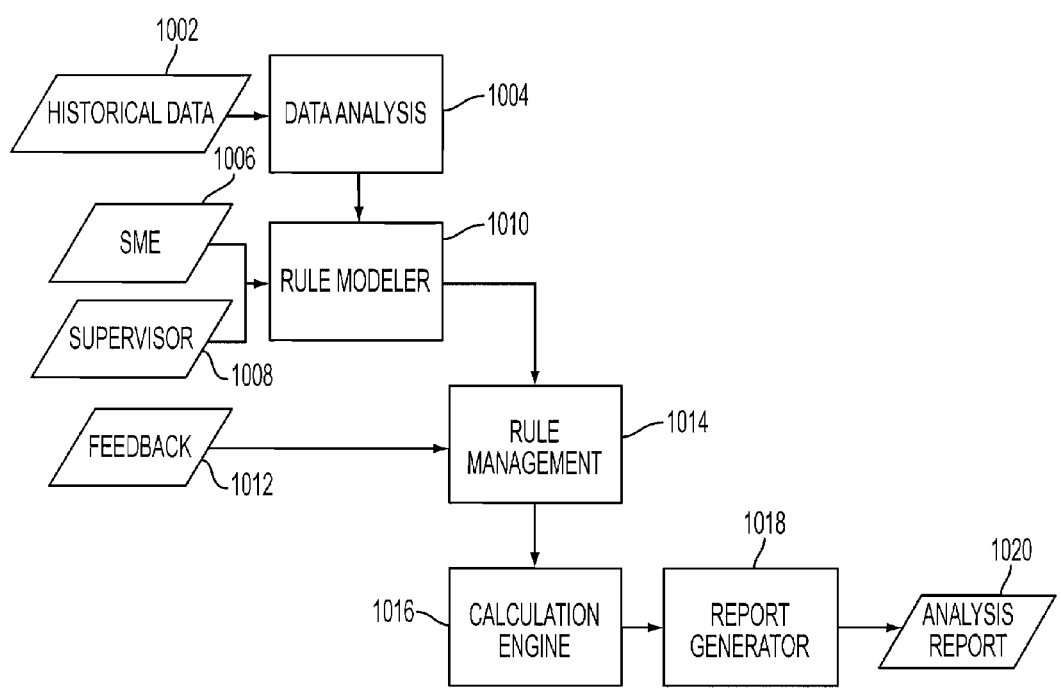
FIG. 10 illustrates detecting irregularity in food manufacturing in one embodiment of the present disclosure.

FIG. 10 illustrates detecting irregularity in food manufacturing in one embodiment of the present disclosure. At 1002, historical data is used to perform data analysis at 1004. The historical data depends on the specific scenarios in practice. Historical data may come from the past traceability system which may include all essential information along the food manufacturing process. Based on those data, statistic analysis and data mining technologies can be used determine the general pattern between input and output in terms of a specific scenarios. For example, one historical data set may be about an A-type feeding system, which is used to feed B-type feeds to C-type pig in summer season. From that scenario, one may be able to determine, for example, by applying regression analysis techniques, that:

one C-type pig consumes 3-6 kilograms (kg) of B-type feed each day; and one kilogram of B-type feed consumes A-type feeding system's power 0.1~0.2 kilowatt-hour (KWH).

At 1010, the output of the data analysis is used to generate a rule modeler. The rule modeler is used to build rules that define the validation of business variables based on the functional relationship among them. For instance, the relationships found from 1004 would be modeled as a formal rule in 1010 for representing the functional relationships among the inputs and output, which would be used as basis to validate whether the ongoing food manufacturing data complies with the rule. For example, "one C-type pig consumes 3-6 kg B-type feed each day" is a finding from the data analysis component above, which can be represented as a function. Denote t as time unit, $B(t)$ as feed consumed at t, and $C(t)$ as number of pig at t, then $B(t)=[3,6]C(t)$. The function can be translated as a kind of formalized rules format. Using Object Constraint Language as a sample, the rule would be described as "pig.feedPerDay<=6 and pig.feedPerDay>=3".

The rule modeler at 1010 may be generated also by using inputs from the subject matter expert (SME) 1006, supervisors 1008 or the like. The functions describing the relationship among business variables can be built from SMEs' knowledge and assumptions.

At 1014, rule management is performed for determining the priority and value of each rule given a complete rule set. Furthermore the priority and value may be adjusted based on feedback at 1012.

The rules formalized from 1010 compose a rule set. Each rule might be violated, and some of the violation may cause more serious food safety problems while other may be not so significant. Thus, the rules may be prioritized according to their significance or degree to which when violated would affect the food safety. The priority of the rules is not unalterable. For instance, the feedback from different channel may trigger the change of the priority of the rules. For example, in response to an occurrence of polluted milk powder event, the rule associated with the ratio of material milk and milk powder may be set at higher priority than other rules.

At 1016, a calculation engine or like processing unit or software determines whether the current data being analyzed conforms to the conversion rules generated at the rule modeler 1010 and managed by the rule manager at 1014. For instance, the calculation engine may compare a food manufacturing or manufacturer's data with the rules formalized at step 1010 to determine whether the data conforms to the rules. The total value of the compliance of each food manufacturing or manufacturer may be calculated according to the information and preset value calculation method.

For example, for monitoring the milk production process, there may be four types of relationships or rules to be considered: Milk feed ratio, Electricity milk ratio, Sanitizer milk ratio, Drug milk ratio. At 1010, the rules can be formalized in Object Constraint Language (OCL) format. Object Constraint Language (OCL) is a declarative language for describing rules that apply to Unified Modeling Language (UML) models. At 1014, each rule may be set with a different weight value for prioritizing the rules. For each rule, such as Milk feed ratio, the ratio is expressed in a normal distribution. At 1016, the Milk feed ratio of the food manufacturing or manufacturer to be monitored may be calculated from the daily data. The ratio can be mapped in normal distribution (left edge, midpoint, right edge), and the mapping corresponded to exact value. For example, consider a function of feed vs. milk. Assume there is benchmark data existing for this function where the data is normalized and expressed as a normal distribution function, i.e., a normal distribution function of feed vs. milk capturing the benchmark data. The data (e.g., daily data) from a farm (which may be referred to as "instance data" or "as-is" data) may be compared with the benchmark data. The comparison can be done by locating the as-is data points in the normal distribution function of the benchmark data. If the as-is data points are significantly out of the acceptable range of the data points of the normal distribution function, there is a possibility of incompliance.

In one embodiment, the compliance score of this food manufacturing or manufacturer with respect to this rule may be computed as being equal to the mapped value of rule multiplied by the weight of the rule.

A sample is shown in Table 1. According to the total score, the manufacturers can be listed in sequence. Extending the above example, suppose there is such benchmark data normal distribution function for every factor—feed, electricity, sanitizer, and vaccination drug, in this example. The value in the below table shows the as-is data value from the benchmark data value. In addition, a weight to each factor may be taken into account—shown in the "Weight" column in the table. The Score is calculated by combining these two, (between as-is and benchmark value) and weights together. The calculation can be a linear function like weighted average. It also can be a non-linear function.

TABLE 1

| Bill of resource | Rule's Weight | As-is Value | Compliance Score |
| --- | --- | --- | --- |
| Milk Feed Ratio | 0.65 | 9.6 | 370 |
| Electricity Milk Ratio | 0.15 | 2.3 | 240 |
| Sanitizer Milk Ratio | 0.1 | 4.5 | 330 |
| Drug Milk Ratio | 0.1 | 1.2 | 260 |
| Aggregated Compliance Score | | | 335.28 |

Figure 11:
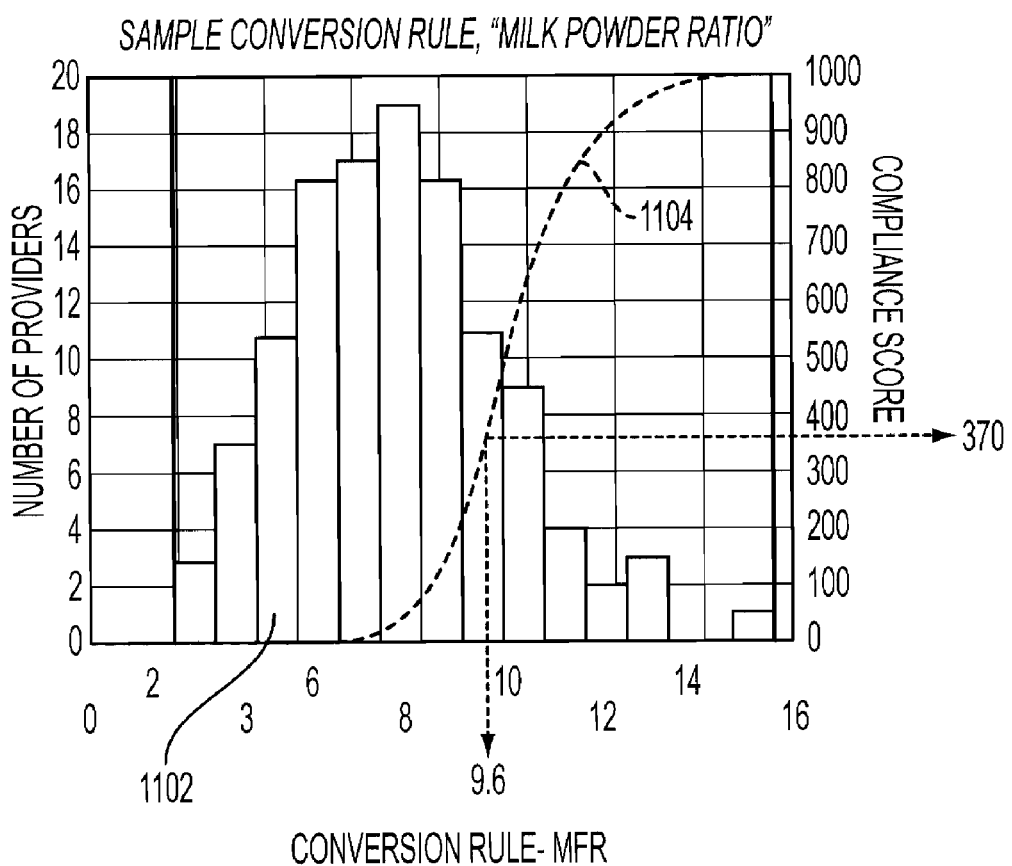
FIG. 11 shows the normal distribution of an example milk-feed ratio of investigated farmers based on available historical data in one embodiment of the present disclosure.
Figure 12:
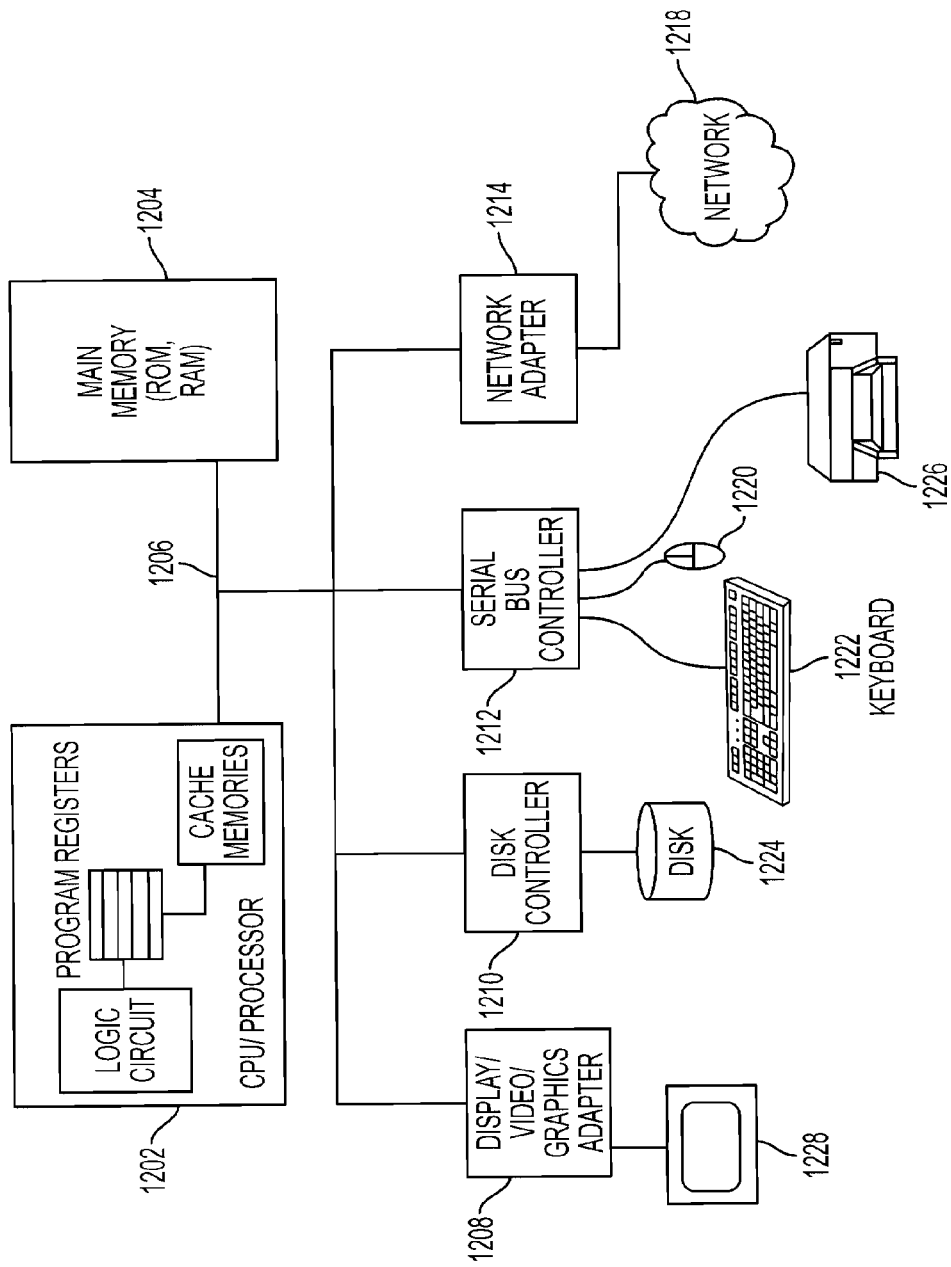
FIG. 12 illustrates an example of a computer system, in which the systems and methodologies of the present disclosure may be carried out or executed.

Take Milk Feed Ratio (MFR) as an example. For example, FIG. 11 shows the normal distribution 1102 (shown as bar graph) of the MFR of investigated farmers (or farmer companies) based on available historical data.

As value of the MFR gets higher (in the right edge), the suspicion becomes is higher. The suspicion may be formalized as the compliance score, for example, ranging from 0~1000 as the curve 1104 shows. Given as-is value of MFR is 9.6, the compliance score of this company on this rule is 370 according to the normal distribution and assigned score shown in FIG. 11. In like manner, other compliance scores shown in Table 1 may be obtained: Compliance Score of Electricity-Milk-Ratio (EMR) is 240 when EMR is 0.15; Compliance Score of Sanitizer-Milk-Ratio (SMR) is 330 when SMR is 0.1; Compliance Score of Drug-Milk-Ratio (DMR) is 260 when DMR is 0.1. The aggregated compliance score of this company on the rules set can be calculated by combining the compliance sore of each rule and the weight of each rule in weight average:

Aggregated Compliance Score=(9.6*370+2.3*240+
4.5*330+1.2*260)/(9.6+2.3+4.5+1.2)=335.28

At 1018, based on the calculation at 1016, reports may be generated, for example, by report generator software. At 1020, analysis report may be provided, for example, in the form of a printout, display on a screen via a graphical user interface, etc.

An example of a conversion rule in a dairy product producing environment may be:
milk feed ratio (MFR) milk: (feed—2 kg)=3

This rule says that a cow can generate 3 kg milk if it consumes 3+2 kg of feed. For example, consider a cow that produces 30 kg milk per day. Based on the ratio, it needs to eat 30/3+2=12 kg of feed. Here 2 kg feed is the basic material to sustain the cow. Extra feed will generate milk.

An example of a compound conversion rule may be:
milk powder ratio (~8)

The above rule says that powdered milk usually reconstitutes at a ratio of 1 to 8, that is, 1 cup of milk powder to about 8 cups of liquid milk.

Other examples of conversion rule may include feed-meat ratios (feed conversion ratios), for instance, broiler chicken requiring 3.4 kilograms of feed to produce one kilogram of ready-to-cook meat, pigs with a feed to meat ratio of 8.4 to 1. For a chicken to lay 1 egg, it needs to consume 3.8 kg of feed, so the ratio is 3.8 to 1. Cheese production ratio may be 7.9 to 1.5. Tilapia, typically, 1.6 to 1.8; poultry has a feed conversion ratio of 2 to 4; ruminants can convert 7 kg of grain to one kilogram of meat. These are observed variables as the source and target, and there is steady relationship among them at required confidence level. It should be noted that those figures are given as examples only. The numbers may be different according to different situations such as the farm methods, types of feeds, animal varieties, locations, etc.

The method described above can identify, as an example, that one cow may produce milk 40 kg per day, and one kg milk may produce 0.1 kg of powder milk. One cow can be linked with 146 kg powder per year. If the collected data associated with the final product has discrepancies from this rule, e.g., because the data varies too much from this estimation, the resulting final product may be suspect.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner (not shown), speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for identifying one or more source material for one or more food items, comprising:
    assigning a sequence of numbers to a plurality of source material received at a processing entity, the sequence of numbers assigned in an order of receiving;
    assigning a different sequence of numbers to a plurality of food product units processed from the plurality of source material at the processing entity, the different sequence of numbers assigned in an order of processing;
    determining a production rate associated with the food product units from a bill of materials associated with the food product units, the bill of materials including at least a list of raw materials and quantities of the raw materials used to manufacture a final food product;
    generating a probability distribution function, by at least one processor, using at least the production rate, and mapping, by the at least one processor, a range of the sequence numbers associated with the plurality of source material to the range of sequence numbers associated with the food product units based on the generated probability distribution function;
    receiving a selected food product whose source material is to be determined; and
    identifying, by the at least one processor, the source material associated with the selected food product by executing a conversion algorithm that uses the probability distribution function to determine the source material associated with the selected food product.
    wherein the identifying includes identifying the source material associated with the selected food product with a level of confidence.

2. The method of claim 1, further including validating the probability distribution function by simulation.

3. The method of claim 1, wherein the identified source material is used in recalling other food products associated with the source material.

4. The method of claim 1, wherein the probability distribution function is generated using data associated with a range estimation of a relationship between a quantity of a source and a target food product produced by the source.

5. The method of claim 4, wherein the data is obtained from a subject matter expert.

6. The method of claim 1, wherein the probability distribution function changes as a function of raw materials and quantities of the raw materials used to manufacture the food product units change.

7. A system for identifying one or more source material for one or more food items, comprising:
    at least one processor;
    a sequence of entry module, executed on the at least one processor, operable to assign a sequence of numbers to a plurality of source materials received at a processing entity, the sequence of numbers assigned in an order of receiving;
    a sequence of exit module, executed on the at least one processor, operable to assign a different sequence of numbers to a plurality of food product units processed from the plurality of source material at the processing entity, the different sequence of numbers assigned in an order of processing;
    a bill of materials module, executed on the at least one processor, operable to determine a production rate associated the end product units from a bill of materials associated with the end product units, the bill of materials including at least a list of raw materials and quantities of the raw materials used to manufacture a final food product;
    a conversion module, executed on the at least one processor, operable to generate a probability distribution function using at least the production rate, and mapping a range of the sequence numbers associated with the plurality of source materials to the range of sequence numbers associated with the food product units based on the generated probability distribution function, the conversion module further operable to generate a conversion algorithm that uses the probability distribution function to determine a source material associated with a selected food product unit, the conversion module further operable to identify the source material associated with the selected food product unit using the conversion algorithm, wherein the conversion module identifies the source material associated with the selected food product unit with a level of confidence.

8. The system of claim 7, wherein the probability distribution function is further validated using simulation.

9. The system of claim 7, wherein the identified source material is used in recalling other food products associated with the source material.

10. The system of claim 7, wherein the probability distribution function is generated using data associated with a range estimation of a relationship between a quantity of a source and a target food product produced by the source.

11. The system of claim 7, wherein the probability distribution function changes as a function of raw materials and quantities of the raw materials used to manufacture the food product units change.

12. A non-transitory, computer readable medium, tangibly embodying a program of instructions executed to perform a method of identifying one or more source materials for one or more food items, comprising:

assigning a sequence of numbers to a plurality of source material received at a processing entity, the sequence of numbers assigned in an order of receiving;

assigning a different sequence of numbers to a plurality of food product units processed from the plurality of source material at the processing entity, the different sequence of numbers assigned in an order of processing;

determining a production rate associated with the food product units from a bill of materials associated with the food product units, the bill of materials including at least a list of raw materials and quantities of the raw materials used to manufacture a final food product;

generating a probability distribution function by a processor using at least the production rate, and mapping a range of the sequence numbers associated with the plurality of source material to a range of the sequence numbers associated with the food product units based on the generated probability distribution function;

receiving a selected food product whose source material is to be determined; and identifying the source material associated with the selected food product by executing a conversion algorithm that uses the probability distribution function to determine the source material associated with the selected end product unit, wherein the identifying includes identifying the source material associated with the selected food product unit with a confidence level.

13. The program storage device of claim 12, further including validating the probability distribution function by simulation.

14. The program storage device of claim 12, wherein the identified source material is used in recalling other food products associated with the source material.

15. The program storage device of claim 12, wherein the probability distribution function is generated using data associated with a range estimation of a relationship between a quantity of a source and a target food product produced by the source.

16. The program storage device of claim 12, wherein the probability distribution function changes as a function of raw materials and quantities of the raw materials used to manufacture the food product units change.

* * * * *